US012755219B2

(12) United States Patent
Wei

(10) Patent No.: US 12,755,219 B2
(45) Date of Patent: Oct. 6, 2026

(54) ELECTRIC-QUANTITY-BASED PATH PLANNING METHOD FOR ELECTRIC VEHICLE COMPATIBLE WITH ENERGY STORAGE CHARGING PILE

(71) Applicant: Tao Wei, NanNing (CN)

(72) Inventor: Tao Wei, NanNing (CN)

( * ) Notice: Subject to any disclaimer, the term of this patent is extended or adjusted under 35 U.S.C. 154(b) by 74 days.

(21) Appl. No.: 18/560,967

(22) PCT Filed: May 14, 2022

(86) PCT No.: PCT/CN2022/092902

§ 371 (c)(1),
(2) Date: Nov. 15, 2023

(87) PCT Pub. No.: WO2022/242579

PCT Pub. Date: Nov. 24, 2022

(65) Prior Publication Data

US 2024/0265316 A1 Aug. 8, 2024

(30) Foreign Application Priority Data

May 15, 2021 (CN) ......................... 202110530786.8

(51) Int. Cl.
*G06Q 10/047* (2023.01)
*G01C 21/34* (2006.01)
(Continued)

(52) U.S. Cl.
CPC ....... *G06Q 10/047* (2013.01); *G01C 21/3469* (2013.01); *G06Q 10/02* (2013.01); *G06Q 50/06* (2013.01)

(58) Field of Classification Search
None
See application file for complete search history.

(56) References Cited

U.S. PATENT DOCUMENTS

2017/0030728 A1* 2/2017 Baglino ............. G01C 21/3469
2017/0343366 A1 11/2017 You et al.
(Continued)

FOREIGN PATENT DOCUMENTS

CN 106989752 7/2017
CN 108162771 6/2018
CN 113283623 8/2021

OTHER PUBLICATIONS

International Search Report, China National Intellectual Property Administration, Jul. 8, 2022.

*Primary Examiner* — Christian Chace
*Assistant Examiner* — Shayne M. Gilbertson
(74) *Attorney, Agent, or Firm* — Bay State IP, LLC

(57) ABSTRACT

The present disclosure discloses an electric-quantity-based path planning method for an electric vehicle compatible with an energy storage charging pile. The method includes the following steps: 1) charging piles in a whole network submitting state information of the piles to a dispatching system platform, and before departure, an electric vehicle applying for a reservation from the dispatching system platform; 2) finding a shortest path from a departure place to a destination; 3) the dispatching system platform judging whether the reserved allocated electric quantity of the electric vehicle at one or more charging piles along the path meets an endurance requirement for driving to the destination; 4) if so, generating a whole-journey reservation scheme; and 5) if not, excluding the shortest path, and finding the shortest path from the remaining paths, and performing cyclic execution from Step 3) until all paths are traversed.

10 Claims, 3 Drawing Sheets

(51) Int. Cl.
*G06Q 10/02* (2012.01)
*G06Q 50/06* (2024.01)

(56) References Cited

U.S. PATENT DOCUMENTS

| | | | | |
|---|---|---|---|---|
| 2018/0143029 | A1* | 5/2018 | Nikulin | G01C 21/3415 |
| 2018/0240047 | A1* | 8/2018 | Mu | B60L 53/11 |
| 2020/0182642 | A1* | 6/2020 | Ellison | B60L 53/67 |
| 2020/0378770 | A1* | 12/2020 | Wei | B60L 53/51 |

* cited by examiner

ELECTRIC-QUANTITY-BASED PATH PLANNING METHOD FOR ELECTRIC VEHICLE COMPATIBLE WITH ENERGY STORAGE CHARGING PILE

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/CN2022/092902 filed on May 14, 2022, and which in turn claims priority under 35 USC 119 to Chinese Patent Application No. 202110530786.8 filed on May 15, 2021, the disclosure of which is incorporated by reference herein in its entirety as part of the present application.

TECHNICAL FIELD

The present disclosure belongs to the field of an electric-quantity-based path planning method for an electric vehicle, in particular to an electric-quantity-based path planning method for an electric vehicle compatible with an energy storage charging pile.

BACKGROUND

At present, electric vehicles based on new energy sources, such as electric cars, electric boats and unmanned aerial vehicles, have been widely used. There are many charging path planning methods for an electric quantity of an electric vehicle in the prior art, but they are basically only suitable for power-grid direct-supply charging piles or charging stations. Most of the existing charging path planning for an electric vehicle is to find a next rechargeable charging station for users to choose by themselves according to detecting the remaining electric quantity of the current power battery of the electric vehicles. When it is necessary to charge for many times to reach the destination in a long distance, there is no reasonable and effective whole-journey electric-quantity-based path planning method. An energy storage charging pile has the advantages of slow storage and quick discharge. However, due to the limited energy storage of the energy storage charging pile or charging station, the idle period is not equal to the effective charging period with enough energy storage, and there is no effective reserving method at present. Furthermore, for the road network including energy storage charging piles or charging stations, it is also an unsolved problem at present about how to realize the fused use of the energy storage charging piles and power grid charging piles in the whole network, and even realize the full utilization of the energy storage electricity quantity of the charging piles in the whole network, especially for serving more electric vehicles.

SUMMARY

Aiming at the problems existing in the prior art, the present disclosure provides an electric-quantity-based path planning method for an electric vehicle compatible with an energy storage charging pile, which realizes the fused use of an energy storage charging pile and a power-grid direct-supply charging pile using arrival time matching and energy time differentiation, and performs charging scheduling on the vehicle through the dispatching system platform at the same time, such that the electric quantity of the charging pile resources, especially an energy storage electricity quantity of an energy storage charging pile, in a whole network is fully utilized. Another object of the present disclosure is to provide an electric quantity reserving method of an energy storage charging pile, which realize the multi-user reservation of the electric quantity of the energy storage charging pile.

The present disclosure uses the following technical scheme to solve the technical problems.

The present disclosure relates to an electric-quantity-based path planning method for an electric vehicle compatible with an energy storage charging pile, wherein a power supply source of the energy storage charging pile is complementary energy storage for generating electricity from new energy or purchasing electricity from a power grid, wherein the method includes the following steps:

1) all charging piles in a whole network submitting state information of the piles to a dispatching system platform, respectively, and before departure, an electric vehicle user applying to the dispatching system platform for a reservation of the electric quantity from departure place O to destination D through network connection, and the electric quantity application reservation includes the following information: an electric vehicle model, a vehicle load quality, a departure time, departure place O, a destination D and a remaining electric quantity of a power battery of an electric vehicle user at the departure time;
2) the dispatching system platform finding a shortest path $l_z$ from a departure place O to a destination D on an existing map, where z=1;
3) the dispatching system platform judging whether the reserved allocated electric quantity at each reserved charging pile meets an endurance requirement of the electric vehicle for driving from the departure place O to the destination D when the electric vehicle selects one or more charging piles along the shortest path $l_z$ to reserve charging respectively according to the state information of the pile submitted by each charging pile and the electric quantity reservation application submitted by the electric vehicle user; if so, executing Step 4), if no, executing Step 5);
4) the dispatching system platform generating a whole-journey reservation scheme for the electric vehicle, wherein the whole-journey reservation scheme includes assigning each reserved charging pile on the shortest path $l_z$ and the corresponding reserved allocated electric quantity for the electric vehicle, and returning information of successful reservation to the electric vehicle user to end the reservation: after the electric vehicle departs from the departure place O, the dispatching system platform guiding the electric vehicle to travel and charge according to the whole-journey reservation scheme;
5) the dispatching system platform excluding the shortest path $l_z$, where z=z+1, and then finding a new shortest path $l_z$ from the remaining paths from the departure place O to the destination D, executing the Steps 3) to 5) circularly if the new shortest path $l_z$ is found, and returning information of failed reservation to the electric vehicle user if the new shortest path $l_z$ is not found.

In Step 3), the electric vehicle selects one or more charging piles along the shortest path $l_z$ to reserve charging respectively, and the selection method is as follows: assuming that there are n charging piles distributed along the shortest path $l_z$, there are $$\left(C_n^1 + C_n^2 + \ldots + C_n^{n-1} + C_n^n\right)$$

charging pile combinations selected for charging by the electric vehicle, and any charging pile combination is selected or the charging pile combination with the least number of the charging piles is reserved for charging.

The specific method of judging whether the reserved allocated electric quantity at each reserved charging pile meets an endurance requirement of the electric vehicle for driving from the departure place O to the destination D when the electric vehicle selects one or more charging piles along the shortest path $l_z$ to reserve charging respectively in Step 3) is as follows:

assuming that the charging pile combination of the electric vehicle reserved to charge in sequence along the shortest path $l_z$ be $(j_{x1}, j_{x2}, \ldots j_{xk})^T$, judging in sequence whether the reserved allocated electric quantity corresponding to each of the charging piles $j_w$ meets an inequality set 2-1-1, wherein if so, the shortest path $l_z$ meets the endurance requirement of the electric vehicle for driving from the departure place O to the destination D: otherwise, the shortest path $l_z$ does not meet the endurance requirement of the electric vehicle for driving from the departure place O to the destination D:

$$\begin{cases} RE_i(t_w) + TP_w \geq EC_{w,w+1} \\ \text{bat\_cap}_{str} + \sum_{w=x1}^{xk} TP_w \geq EC_{0,n+1} \end{cases} \forall\, w \in [x1, xk] \qquad 2\text{-}1\text{-}1$$

wherein in the inequality set 2-1-1, $RE_i(t_w)$ is an estimated remaining electric quantity of the electric vehicle at the time $t_w$ when the electric vehicle arrives at the charging pile $j_w$, $TP_w$ denotes the reserved allocated electric quantity of the electric vehicle at the charging pile $j_w$, $EC_{w,w+1}$ denotes the estimated energy consumption of the electric vehicle from the current charging pile $j_w$ to the next charging pile $j_{w+1}$, if the charging pile $j_w$ is the last charging pile in the shortest path $l_z$, $EC_{w,w+1}$ denotes the estimated energy consumption of the electric vehicle from the current charging pile $j_w$ to the destination D; $\text{bat\_cap}_{str}$ is the initial remaining electric quantity of the power battery at the departure time $t_0$ of the electric vehicle;

$$\sum_{w=x1}^{xk} TP_w$$

denotes the sum of the reserved allocated electric quantity of all the reserved charging piles of the electric vehicle at the charging pile combination $(j_{x1}, j_{x2}, \ldots j_{xk})^T$; $EC_{0,n+1}$ denotes the estimated whole-journey energy consumption of the electric vehicle along the shortest path $l_z$ from the departure place O to the destination D.

The time $t_w$ when the electric vehicle arrives at the charging pile $j_w$ is estimated according to the following Equation 6-1:

$$t_w = t_0 + \text{the sum of the pre-reserved charging duration} + \text{the sum of the pre-queuing charging duration} + t_{0,w} \qquad 6\text{-}1$$

in Equation 6-1, $t_0$ denotes the departure time of the electric vehicle; $t_{0,w}$ denotes the estimated driving duration of the electric vehicle along the shortest path $l_z$ from the departure place O to the charging pile $j_w$: the sum of the pre-reserved charging duration refers to the cumulative value of the estimated reserved charging duration that has reserved for charging at other charging piles along the path when the electric vehicle arrives at the charging pile $j_w$ along the shortest path $l_z$ from the departure place O: the sum of the pre-queuing charging duration refers to the cumulative value of the estimated queuing charging duration that has reserved for charging at other charging piles along the path when the electric vehicle arrives at the charging pile $j_w$ along the shortest path $l_z$ from the departure place O.

The remaining electric quantity $RE_i(t_w)$ of the electric vehicle at the time $t_w$ when the electric vehicle arrives at the charging pile $j_w$ is estimated according to the following Equation 7-1:

$$RE_i(t_w) = \text{bat\_cap}_{str} + \text{the sum of the pre-reserved allocated electric quantity} - EC_{0,w} \qquad 7\text{-}1$$

in Equation 7-1, $\text{bat\_cap}_{str}$ is an initial remaining electric quantity when the electric vehicle departs: the sum of the pre-reserved allocated electric quantity refers to the cumulative value of the reserved allocated electric quantity at other charging piles along the path up to the time $t_w$ when the electric vehicle arrives at the charging pile $j_w$ from the departure place O along the shortest path $l_z$; $EC_{0,w}$ indicates the estimated energy consumption of the electric vehicle driving along the shortest path $l_z$ from the departure place O to the charging pile $j_w$.

The reserved allocated electric quantity of the electric vehicle at the charging pile $j_w$ is $TP_w$, and when the charging pile $j_w$ is an energy storage charging pile, the specific step of the method for estimating the reserved allocated electric quantity $TP_w$ is as follows:

(10-1-1), assuming that the electric vehicle is an electric vehicle i, presetting a queuing time limit $\sigma$ after the time $t_w$ when the electric vehicle i arrives at the charging pile $j_w$ first, where $\sigma$ is a user-defined time value;

(10-1-2), according to a reserved service list of the charging pile $j_w$, searching types of the idle period of the charging pile $j_w$ between $t_w$ and $t_w+\sigma$, wherein if all the found types of the idle period are energy storage periods, the charging pile $j_w$ is incapable of reserving for charging the electric vehicle i, that is, the reserved allocated electricity quantity $TP_w=0$; if the found idle period type is an allocable electricity quantity idle period, proceeding to Step (10-1-3);

(10-1-3), searching the reserved service list of the charging pile $j_w$, if the idle period of the charging pile $j_w$ between $t_w$ and $t_w+\sigma$ is $$[t_1^\circ, \infty), [t_1^\circ, \infty)$$

indicates that there is no vehicle reserving for charging after $$t_1^\circ,$$

that is, $$[t_1^{\circ}, \infty)$$

is the allocable electricity quantity idle period and is infinite; if the idle period of the charging pile $j_w$ is not infinite between $t_w$ and $t_w+\sigma$, proceeding to Step (10-1-4); assuming that the preceding vehicle $i_1$ has reserved for charging in a period $$[t_1, t_1^{\circ}],$$

where $t_1$ and $$t_1^{\circ}$$

correspond to the reserved charging start time and the reserved charging end time of the preceding vehicle $i_1$ respectively, $E(t_1)$ and $$E(t_1^{\circ})$$

correspond to the estimated remaining electric quantity of the charging pile $j_w$ at the time $t_1$ and $$t_1^{\circ},$$

and the reserved allocated electric quantity of the preceding vehicle $i_1$ is $$TP_1 = E(t_1^{\circ}) - E(t_1);$$

the reserved charging start time $$t_{w,i}^{charging}$$

of the electric vehicle i at the charging pile $j_w$ is estimated according to the following Equation 10-1:

$$t_{w,i}^{charging} = \max(t_1^{\circ}, t_w) \qquad 10\text{-}1$$

the allocable electricity quantity $$Q_w(t_{w,i}^{charing})$$

of the charging pile $j_w$ in $$[t_1^{\circ}, \infty)$$

is estimated according to the following equation set 10-2:

$$\begin{cases} Q_w(t_{w,i}^{charging}) = E(t_1^{\circ}) + \int_{t_1^{\circ}}^{t_{w,i}^{charging}} p_{storage}(t) \times d(t), \\ \quad \text{when } t_1^{\circ} \le t_{w,i}^{charging} \le t^{rated} \\ Q_w(t_{w,i}^{charging}) = E_{rated} \text{ when } t_{w,i}^{charging} > t^{rated} \end{cases}$$

10-2 the constraint condition of the equation set 10-2 is as follows:

$$0 \le E(t_1^{\circ}) + \int_{t_1^{\circ}}^{t_{w,i}^{charging}} p_{storage}(t) \times d(t) \le E_{rated}$$

the reserved allocable electricity quantity $TP_w$ of the charging pile $j_w$ in $$[t_1^{\circ}, \infty)$$

is estimated according to the following equation set 10-3:

$$TP_w = \min(Q_w(t_{w,i}^{charging}), (\text{bat\_cap}_i - RE_i(t_w))) \qquad 10\text{-}3$$

the reserved charging duration $$T_{w,i}^{charging}$$

of the electric vehicle i at the charging pile $j_w$ is estimated according to the following Equation 10-4:

$$T_{w,i}^{charging} = TP_w \div P_w^{out} \qquad 10\text{-}4$$

the remaining electric quantity of the reserved charging start time $$t_{w,i}^{charging}$$

corresponding to the charging pile $j_w$ is $$E(t_{w,i}^{charging}) = Q_w(t_{w,i}^{charging}),$$

the remaining electric quantity of the reserved charging end time $$(t_{w,i}^{charging} + T_{w,i}^{charging})$$

corresponding to the charging pile $$j_w \text{ is } E\left(t_{w,i}^{charging} + T_{w,i}^{charging}\right) = E\left(t_{w,i}^{charging}\right) - TP_w;$$

the above variables in the equations in Step (10-1-3) are defined as follows:

$$t_{w,i}^{charging}$$

is the reserved charging start time of the electric vehicle i at the charging pile $j_w$; $t_w$ is the estimated time when the electric vehicle i arrives at the charging pile $$j_w;\ Q_w\left(t_{w,i}^{charging}\right)$$

is the allocable electricity quantity of the charging pile $$j_w \text{ in } [\mathring{t}_1, \infty);\ E(\mathring{t}_1)$$

is the remaining electric quantity of the charging pile $j_w$ at the reserved charging end time $$\mathring{t}_1$$

corresponding to the preceding vehicle $i_1$; $p_{storage}(t)$ is the predicted energy storage power of the charging pile $j_w$ at the corresponding time t, which is predicted by the prior art method:

$$P_w^{out}$$

is a constant output power of the charging pile $j_w$; $E_{rated}$ is the rated electricity quantity of the energy storage battery of the charging pile $j_w$; $t^{rated}$ is the time when the energy storage of the charging pile $j_w$ reaches the rated electricity quantity $E_{rated}$ in $$[\mathring{t}_1, \infty);$$

$bat\_cap_i$ is the rated electricity quantity of the power battery of the electric vehicle i, $RE_i(t_w)$ is the estimated remaining electric quantity of the electric vehicle i at the time $t_w$ when the electric vehicle arrives at the charging pile $j_w$; $TP_w$ is the reserved allocated electricity quantity of the electric vehicle i in $$[\mathring{t}_1, \infty)$$

of the charging pile $j_w$;

$$T_{w,i}^{charging}$$

is the reserved charging duration of the electric vehicle i at the charging pile $j_w$;

(10-1-4), if the idle period of the charging pile $j_w$ between $t_w$ and $t_w+\sigma$ is an allocable idle period and is finite, assuming that the preceding vehicle $i_1$ has reserved for charging at the charging pile $j_w$ in the period $$[t_1, \mathring{t}_1],$$

the reserved allocated electric quantity is $$TP_1 = E\left(\mathring{t}_1\right) - E(t_1);$$

assuming that the preceding vehicle $i_2$ has reserved for charging at the charging pile $j_w$ in the period $$[t_2, \mathring{t}_2],$$

the reserved allocated electric quantity is $$TP_2 = E\left(\mathring{t}_2\right) - E(t_2);$$

where $t_1$ and $$\mathring{t}_1$$

correspond to the reserved charging start time and the reserved charging end time of the preceding vehicle $i_1$, respectively, $$\mathring{t}_2$$

correspond to the reserved charging start time and the reserved charging end time of the preceding vehicle $i_2$, respectively;

$$t_1 < \mathring{t}_1 < t_2 < \mathring{t}_2;\ E(t_1),\ E\left(\mathring{t}_1\right),\ E(t_2) \text{ and } E\left(\mathring{t}_2\right)$$

correspond to the estimated remaining electric quantity of the charging pile $j_w$ at the time $t_1$, $$\overset{\circ}{t_1},$$

$t_2$,
and $$\overset{\circ}{t_2};$$

$$[\overset{\circ}{t_1}, t_2]$$

is the allocable electricity quantity idle period, the precondition for the charging pile $j_w$ to allow the electric vehicle i to jump a queue to reserve for charging in the allocable electricity quantity idle period $$[\overset{\circ}{t_1}, t_2]$$

is to not affect the reserved allocated electricity quantity and the reserved charging start and end time of other preceding vehicles that have already reserved for charging after this period $$[\overset{\circ}{t_1}, t_2],$$

that is, ensuring that the reserved allocated electricity quantity $TP_2$ of the preceding vehicle $i_2$ in the reserved charging period $$[t_2, \overset{\circ}{t_2}]$$

remains unchanged first, that is, meeting the following Equation 10-5:

$$TP_2 \le E(\overset{\circ}{t_1}) + \int_{\overset{\circ}{t_1}}^{t_{w,i}^{charging}} p_{storage}(t) \times d(t) - P_w^{out} \times \left(\overset{\circ}{t_3} - t_{w,i}^{charging}\right) + \int_{\overset{\circ}{t_3}}^{t_2} p_{storage}(t) \times d(t) \quad \text{10-5}$$

the constraint condition of Equation 10-5 is:

$$\begin{cases} E(\overset{\circ}{t_1}) + \int_{\overset{\circ}{t_1}}^{t_{w,i}^{charging}} p_{storage}(t) \times d(t) - P_w^{out} \times \left(\overset{\circ}{t_3} - t_{w,i}^{charging}\right) + \int_{\overset{\circ}{t_3}}^{t_2} p_{storage}(t) \times d(t) \le E_{rated} \\ 0 \le E(\overset{\circ}{t_1}) + \int_{\overset{\circ}{t_1}}^{t_{w,i}^{charging}} p_{storage}(t) \times d(t) \le E_{rated} \\ P_w^{out} \times \left(\overset{\circ}{t_3} - t_{w,i}^{charging}\right) \le E(\overset{\circ}{t_1}) + \int_{\overset{\circ}{t_1}}^{t_{w,i}^{charging}} p_{storage}(t) \times d(t) \\ t_1 < \overset{\circ}{t_1} \le t_{w,i}^{charging} < \overset{\circ}{t_3} < t_2 < \overset{\circ}{t_2} \end{cases}$$

according to Equation 10-5 and its constraint condition, calculating the latest charging end time $$\overset{\circ}{t_3}$$

of the electric vehicle i when the charging pile $j_w$ allows the electric vehicle i to jump a queue for charging, and estimating the allocable electric quantity $$Q_w\left(t_{w,i}^{charging}\right)$$

of the charging pile $j_w$ in the allocable electric quantity idle period $$[\overset{\circ}{t_1}, t_2]$$

according to the following equation set 10-6:

$$\begin{cases} Q_w\left(t_{w,i}^{charging}\right) = E(\overset{\circ}{t_1}) + \int_{\overset{\circ}{t_1}}^{t_{w,i}^{charging}} p_{stoorage}(t) \times d(t) t_{w,i}^{charging} < t^{rated} \\ Q_w\left(t_{w,i}^{charging}\right) = E_{rated}, \text{ when } t^{rated} \le t_{w,i}^{charging} < \overset{\circ}{t_3} \text{ and } \left(\overset{\circ}{t_3} - t_{w,i}^{charging}\right) > \left(\frac{E_{rated}}{P_w^{out}}\right) \\ Q_w\left(t_{w,i}^{charging}\right) = P_w^{out} \times \left(\overset{\circ}{t_3} - t_{w,i}^{charging}\right), \text{ when } t^{rated} \le t_{w,i}^{charging} < \overset{\circ}{t_3} \text{ and } \left(\overset{\circ}{t_3} - t_{w,i}^{charging}\right) \le \end{cases} \quad \text{10-6}$$

in the Equation 10-5 and Equation 10-6, estimating the reserved charging start time $$t_{w,i}^{charging}$$

of the electric vehicle i at the charging pile $j_w$ according to the following Equation 10-7:

$$t_{w,i}^{charging} = \max(t_1^{\circ}, t_w) \tag{10-7}$$

obtaining $$Q_w\left(t_{w,i}^{charging}\right)$$

according to Equation 10-6, and estimating the reserved allocated electric quantity $TP_w$ of the electric vehicle i at the charging pile $j_w$ according to the following Equation 10-8:

$$TP_w = \min\left(Q_w\left(t_{w,i}^{charging}\right), (\text{bat\_cap}_i - RE_i(t_w))\right) \tag{10-8}$$

obtaining $TP_w$ according to Equation 10-8, and estimating the reserved allocated charging duration $$T_{w,i}^{charging}$$

of the electric vehicle i at the charging pile $j_w$ according to the following Equation 10-8:

$$T_{w,i}^{charging} = TP_w \div P_w^{out} \tag{10-9}$$

if there are other preceding vehicles that reserve for charging at the charging pile $j_w$ before the electric vehicle i, but the time for reserving for charging is after the period $$[t_2, t_2^{\circ}]$$

of the preceding vehicle $i_2$ reserved for charging, the precondition for the charging pile $j_w$ to allow the electric vehicle i to jump a queue to reserve for charging in the allocable electricity quantity idle period $$[t_1^{\circ}, t_2]$$

is that in addition to ensuring that the reserved allocated electricity quantity $TP_2$ of the preceding vehicle $i_2$ in the reserved charging period $$[t_2, t_2^{\circ}]$$

remains unchanged, it is also necessary to ensure that the reserved start and end time and the reserved allocated electricity quantity of all other preceding vehicles remain unchanged, and the specific methods are as follows:

assuming that there are other preceding vehicles $i_4$ that reserve for charging in the period $$[t_4, t_4^{\circ}]$$

before the electric vehicle i, the reserved allocated electric quantity is $TP_4$, in which $$t_2 < t_2^{\circ} < t_4 < t_4^{\circ},$$

$TP_w$ also meets the following Equation 10-10:

$$TP_4 \le E(t_1^{\circ}) + \int_{t_1^{\circ}}^{t_{w,i}^{charging}} p_{storage}(t) \times d(t) - TP_w + \int_{t_{w,i}^{charging}+T_{w,i}^{charging}}^{t_2} p_{storage}(t) \times d(t) - TP_2 + \int_{t_2^{\circ}}^{t_4} p_{storage}(t) \times d(t) \tag{10-10}$$

if $TP_w$ does not meet Equation 10-10, $TP_w$ is reduced, and the corresponding $$T_{w,i}^{charging}$$

is also reduced according to Equation 10-9 until Equation 10-10 is met;

if after the reserved charging period $$[t_4, t_4^{\circ}]$$

of the preceding vehicle $i_4$, there are other preceding vehicles $i_5$, $i_6$ . . . reserving for charging at the charging pile $j_w$ before the electric vehicle i, the preceding vehicles are processed according to the method of the preceding vehicle $i_4$ respectively until $TP_w$ can ensure that the reserved start and end time and reserved allocated electric quantity of all other preceding vehicles remain unchanged; if $TP_w$ is reduced to the preset threshold value, but it is not ensured that the reserved start and end time and the reserved allocated electric quantity of all other preceding vehicles remain unchanged, and the charging pile $j_w$ does not allow the electric vehicle i to jump a queue for reserved charging in the idle period $$[t_1^{\circ}, t_2],$$

that is, assuming that the reserved allocated electric quantity is $TP_w$=0;

if the final $TP_w \neq 0$, the remaining electric quantity of the charging pile $j_w$ corresponding to the reserved charging start time $$t_{w,i}^{charging}$$

is $$E(t_{w,i}^{charging}) = E(t_1^{\circ}) + \int_{t_1^{\circ}}^{t_{w,i}^{charging}} p_{storage}(t) \times d(t),$$

and the remaining electric quantity of the charging pile $j_w$ corresponding to the reserved charging end time $$(t_{w,i}^{charging} + T_{w,i}^{charging})$$

is $$E(t_{w,i}^{charging} + T_{w,i}^{charging}) = E(t_{w,i}^{charging}) - TP_w;$$

the above variables in the equations in Step (10-1-4) are defined as follows: $TP_2$ is the reserved allocated electricity quantity of the preceding vehicle $i_2$ in the reserved charging period $$[t_2, t_2^{\circ}];$$

$$E(t_1^{\circ})$$

is the remaining electric quantity of the charging pile $j_w$ at the reserved charging end time $$t_1^{\circ}$$

corresponding to the preceding vehicle $i_1$; $p_{storage}(t)$ is the predicted energy storage power of the charging pile $j_w$ at the corresponding time t, which is predicted by the prior charging is the reserved art method;

$$P_w^{out}$$

is a constant output power of the charging pile $j_w$;

$$t_{w,i}^{charging}$$

is the reserved charging start time of the electric vehicle i at the charging pile $j_w$; $t_w$ is the estimated time when the electric vehicle i arrives at the charging pile $j_w$; $E_{rated}$ is the rated electricity quantity of the energy storage battery of the charging pile $j_w$;

$$t_3^{\circ}$$

is the latest charging end time of the electric vehicle i when the charging pile $j_w$ allows the electric vehicle i to jump a queue for charging, and $$Q_w(t_{w,i}^{charging})$$

is the estimated allocable electric quantity of the charging pile $j_w$ in $$[t_1^{\circ}, t_2];$$

$t^{rated}$ is the time when the energy storage of the charging pile $j_w$ reaches the rated electricity quantity $E_{rated}$ in $$[t_1^{\circ}, \infty);$$

$bat\_cap_i$ is the rated electricity quantity of the power battery of the electric vehicle i, $RE_i(t_w)$ is the estimated remaining electric quantity of the electric vehicle i at the time $t_w$ when the electric vehicle arrives at the charging pile $j_w$; $TP_w$ is the reserved allocated electricity quantity of the electric vehicle i in $$[t_1^{\circ}, \infty)$$

of the charging pile $j_w$;

$$T_{w,i}^{charging}$$

is the reserved charging duration of the electric vehicle i at the charging pile $j_w$; $TP_4$ is the reserved allocated electric quantity of the preceding vehicle $i_4$ in the period $$[t_4, t_4^{\circ}].$$

The electric-quantity-based path planning method further includes Step (10-1-5), wherein every time a Δt time passes, the dispatching system platform executes from Step (10-1-2) to Step (10-1-4) according to the re-updated reserved service list of the charging pile $j_w$, and re-estimates the reserved allocated electric quantity $TP_w$.

The reserved allocated electric quantity of the electric vehicle at the charging pile $j_w$ is $TP_w$, and when the charging pile $j_w$ is a power-grid direct-supply charging pile, the specific step of the method for estimating the reserved allocated electric quantity $TP_w$ is as follows:

(10-2-1), assuming that the electric vehicle is an electric vehicle i, setting a queuing time limit σ after the time $t_w$ when the electric vehicle i arrives at the charging pile $j_w$ first, where σ is a user-defined time value;

(10-2-2), according to a reserved service list of the charging pile $j_w$, finding whether there is an idle period between the time $t_w$ and the time $t_w+0$ when the electric vehicle i arrives at the charging pile $j_w$; wherein if there is no idle period, estimating the allocable electric quantity $Q_w(i)=0$ that the charging pile $j_w$ is capable of supplying to the electric vehicle i; that is, the reserved allocated electricity quantity $TP_w=0$ of the electric vehicle i at the charging pile $j_w$; if there is an idle period, proceeding to Step (10-2-3);

(10-2-3), if the idle period is infinite, the idle period is denoted as $$[t_1^{\circ}, \infty),$$

where $$t_1^{\circ}$$

corresponds to the reserved charging end time of the preceding vehicle $i_1$ and there is no other preceding vehicle reserved for charging after $$t_1^{\circ};$$

the reserved allocated electric quantity $TP_w$ of the electric vehicle i at the charging pile $j_w$ is estimated according to Equation 10-11:

$$TP_w = \text{bat\_cap}_i - RE_i(t_w) \qquad 10\text{-}11$$

in Equation 10-11, $\text{bat\_cap}_i$ is the rated electricity quantity of the power battery of the electric vehicle i, $RE_i(t_w)$ is the estimated remaining electric quantity of the electric vehicle i at the time $t_w$ when the electric vehicle arrives at the charging pile $j_w$;

the reserved charging start time of the electric vehicle i at the charging pile $j_w$ is $$t_{w,i}^{charging} = \max(t_1^{\circ}, t_w);$$

where $t_w$ is the estimated time when the electric vehicle i arrives at the charging pile $j_w$;

obtaining $TP_w$ according to Equation 10-11, and the reserved charging duration is $$T_{w,i}^{charging} = TP_w \div P_w^{out};$$

where $$P_w^{out}$$

is a constant output power of the charging pile $j_w$;

(10-2-4), if the idle period is finite, assuming that the preceding vehicle $i_1$ has reserved for charging at the charging pile $j_w$ in the period $$[t_1, t_1^{\circ}];$$

there is a preceding vehicle $i_2$ that has reserved for charging at the charging pile $j_w$ in the period $$[t_2, t_2^{\circ}];$$

where $t_1$ and $$t_1^{\circ}$$

correspond to the reserved charging start time and the reserved charging end time of the preceding vehicle $i_1$, respectively, $t_2$ and $$t_2^{\circ}$$

correspond to the reserved charging start time and the reserved charging end time of the preceding vehicle $i_2$, respectively;

$$t_1 < t_1^{\circ} < t_2 < t_2^{\circ};$$

and the reserved allocated electric quantity $TP_w$ of the electric vehicle i at the charging pile $j_w$ is estimated according to the following Equation 10-12:

$$TP_w = \min\{(\text{bat\_cap}_i - RE_i(t_w)), P_w^{out} \times (t_2 - t_{w,i}^{charging})\} \qquad 10\text{-}12$$

in Equation 10-12, $\text{bat\_cap}_i$ is the rated electricity quantity of the power battery of the electric vehicle i, $RE_i(t_w)$ is the estimated remaining electric quantity of the electric vehicle i at the time $t_w$ when the electric vehicle arrives at the charging pile $j_w$;

$$P_w^{out}$$

is a constant output power of the charging pile $j_w$;

$$t_{w,i}^{charging}$$

is the reserved charging start time of the electric vehicle i at the charging pile $j_w$, $$t_{w,i}^{charging} = \max(\overset{\circ}{t_1}, t_w);$$

the reserved charging duration of the electric vehicle i at the charging pile $j_w$ is $$T_{w,i}^{charging} = TP_w \div P_w^{out}.$$

The time $t_w$ when the electric vehicle arrives at the charging pile $j_w$ is replaced with $t_w-\theta$ or $t_w+\theta$, where $\theta$ is a user-defined duration value.

The electric-quantity-based path planning method further includes a method for adjusting the preceding vehicle as follows:

assuming that prior to the reservation of the electric vehicle i, the existing preceding vehicles reserve for charging and generate their own whole-journey reservation schemes, respectively: when the electric vehicle i reserves for charging according to the electric-quantity-based path planning method for the electric vehicle compatible with the energy storage charging pile, and when the shortest path $l_z$ in the selected path set $L=\{l_1, \ldots, l_a\}$ from the departure place O to the destination D does not meet the whole-journey endurance requirement, adjusting the whole-journey reservation scheme of the preceding vehicle, including canceling or reducing the reserved allocated electric quantity of the preceding vehicle at one or more common piles, judging whether the shortest path $l_z$ of the electric vehicle i and the path of the original whole-journey reservation scheme of the preceding vehicle meet the whole-journey endurance requirements of the electric vehicle i and the preceding vehicle, respectively, wherein if so, the dispatching system platform generates a whole-journey reservation scheme for the electric vehicle i, and generates a new whole-journey reservation scheme for the preceding vehicle, and the adjustment is successful; if any of the vehicles does not meet the whole-journey endurance requirement, it is impossible to adjust the preceding vehicle and restore the original whole-journey reservation scheme of the preceding vehicle.

An electric quantity reserving method of an energy storage charging pile includes the following steps:

(1) an energy storage charging pile establishes and stores a reserved service list of the pile, and the field contents of the reserved service list include an electric vehicle user name, an electric vehicle brand, an vehicle model, reserved charging start time and charging pile remaining electric quantity corresponding to the time, reserved charging end time and charging pile remaining electric quantity corresponding to the time, reserved allocated electric quantity, reserved charging duration, a type of the idle periods and corresponding allocable electricity quantity;

(2) the energy storage charging pile announces the type of each idle period of the pile and the corresponding allocable electric quantity without affecting the period when the preceding vehicle has reserved for charging and the reserved allocable electric quantity;

(3) a vehicle-mounted terminal of the electric vehicle is connected with the energy storage charging pile through a wireless network, the type of the idle period and the corresponding allocable electric quantity announced in Step (2) are obtained, and an electric vehicle user selects a suitable idle period as required to reserve for charging the energy storage charging pile through the vehicle-mounted terminal of the electric vehicle;

(4) after the electric vehicle is reserved, the energy storage charging pile updates the reserved service list of the pile according to the reserved result of Step (3).

The energy storage charging pile announces the type of each idle period of the pile and the corresponding allocable electric quantity in Step (2), and the specific method is as follows:

the idle period is divided into two types: the energy storage period and the allocable electric quantity idle period of the energy storage charging pile $j_w$;

searching the reserved service list of the charging pile $j_w$, assuming that vehicles have reserved for charging before and after the idle period $$[\overset{\circ}{t_1}, t_2],$$

if a preceding vehicle $i_1$ has reserved for charging in the period $$[t_1, \overset{\circ}{t_1}],$$

the reserved allocated electric quantity is $$TP_1 = E(\overset{\circ}{t_1}) - E(t_1);$$

a preceding vehicle $i_2$ has reserved for charging in the period $$[t_2, \overset{\circ}{t_2}],$$

the reserved allocated electric quantity is $$TP_2 = E(\overset{\circ}{t_2}) - E(t_2);$$

where $t_1$ and $$\overset{\circ}{t_1}$$

correspond to the reserved charging start time and the reserved charging end time of the preceding vehicle $i_1$ respectively, and where $t_2$ and $$\overset{\circ}{t_2}$$

correspond to the reserved charging start time and the reserved charging end time of the preceding vehicle $i_2$ respectively;

$$t_1 < \mathring{t}_1 < t_2 < \mathring{t}_2;$$

$$E(t_1), E(\mathring{t}_1),$$

correspond to the estimated remaining electric quantity of the charging pile $j_w$ at the time $$t_1, \mathring{t}_1, t_2 \text{ and } \mathring{t}_2;$$

(A) the types of the idle periods $$[\mathring{t}_1, t_2]$$

are announced as follows:

when the following Equation 9-1 is met, $$[\mathring{t}_1, t_2]$$

is announced to be the energy storage period of the energy storage charging pile $j_w$:

$$\begin{cases} 0 \le E(t_2) \le E_{rated} \text{ and } E(t_2) = TP_2 \\ E(t_2) = E(\mathring{t}_1) + \int_{\mathring{t}_1}^{t_2} p_{storage}(t) \times d(t) \\ t_1 < \mathring{t}_1 < t_2 < \mathring{t}_2 \end{cases} \quad 9\text{-}1$$

in Equation 9-1, $E_{rated}$ is the rated electricity quantity of the energy storage battery of the energy storage charging pile $j_w$; $p_{storage}(t)$ is the predicted energy storage power of the energy storage charging pile $j_w$ at the time t, which is predicted by the prior art method;

the energy storage period of the energy storage charging pile $j_w$ is only used for energy storage of this pile, that is, the corresponding allocable electricity quantity is 0;

(B) the method for announcing the allocable electric quantity idle period of the energy storage charging pile $j_w$ is as follows:

after excluding the energy storage period of the energy storage charging pile $j_w$ announced in Step (A) from all the idle periods of the energy storage charging pile $j_w$, the remaining periods are the allocable electricity quantity idle periods of the energy storage charging pile $j_w$;

dividing the allocable electric quantity idle period into time points according to a fixed duration ρ, where ρ is a user-defined constant, setting the idle period $$[\mathring{t}_1, t_2]$$

as the allocable electric quantity idle period which can be divided into several time points $$\mathring{t}_1, (\mathring{t}_1 + \rho),$$

$$(\mathring{t}_1 + 2 \times \rho), \ldots . \ \mathring{t}_1 + k \times \rho, (\mathring{t}_1 + (k+1) \times \rho), \ldots .. \ t_2, k = 0, 1, 2, 3 \ldots . , \exists k \in N,$$

and the setting reserved charging start time of the electric vehicle in the allocable electric quantity idle period as the time point $$(\mathring{t}_1 + k \times \rho);$$

where the allocable electricity quantity idle period of the energy storage charging pile $j_w$ must meet the following Equation 9-2:

$$TP_2 \le E(\mathring{t}_1) + \int_{\mathring{t}_1}^{\mathring{t}_1 + k \times \rho} p_{storage}(t) \times d(t) - P_w^{out} \times (\mathring{t}_3 - (\mathring{t}_1 + k \times \rho)) + \int_{\mathring{t}_3}^{t_2} p_{storage}(t) \times d(t) \quad 9\text{-}2$$

the constraint condition of Equation 9-2 is:

$$\begin{cases} 0 \le E(\mathring{t}_2) \le E_{rated} \\ 0 \le E(t_2) \le E_{rated} \\ 0 \le E(\mathring{t}_1) + \int_{\mathring{t}_1}^{\mathring{t}_1 + k \times \rho} p_{storage}(t) \times d(t) \le E_{rated} \\ P_w^{out} \times (\mathring{t}_3 - (\mathring{t}_1 + k \times \rho)) \le E(\mathring{t}_1) + \int_{\mathring{t}_1}^{\mathring{t}_1 + k \times \rho} p_{storage}(t) \times d(t) \\ t_1 < \mathring{t}_1 \le (\mathring{t}_1 + k \times \rho) < \mathring{t}_3 < t_2 < \mathring{t}_2 \end{cases}$$

in Equation 9-2 and its constraint conditions, $p_{storage}(t)$ is the predicted energy storage power of the energy storage charging pile $j_w$ at the time t, which is predicted by the prior art method;

$$P_W^{out}$$

is a constant output power of the charging pile $j_w$; $E_{rated}$ is the rated electricity quantity of the energy storage battery of the energy storage charging pile $j_w$;

$$\mathring{t}_3$$

is the latest charging end time for an electric vehicle;

the latest charging end time $$\mathring{t}_3$$

of the electric vehicle can be obtained from Equation 9-2 and its constraint conditions, $$[\overset{\circ}{t_3}, t_2]$$

is the energy storage period of the energy storage charging pile $j_w$;

the corresponding allocable electric quantity $Q_w$ (t) of the energy storage charging pile $j_w$ at the time point $$(\overset{\circ}{t_1} + k \times \rho)$$

in the allocable electricity quantity idle period $$[\overset{\circ}{t_1}, t_2]$$

is estimated according to the following equation set 9-3:

$$\begin{cases} Q_w(t) = E(\overset{\circ}{t_1}) + \int_{\overset{\circ}{t_1}}^{\overset{\circ}{t_1}+k\times\rho} p_{storage}(t)\times d(t), \text{ when } (\overset{\circ}{t_1} + k\times\rho) < t^{rated} \\ Q_w(t) = E_{rated}, \text{ when } t^{rated} \le (\overset{\circ}{t_1} + k\times\rho) < \overset{\circ}{t_3} \text{ and } \\ \quad (\overset{\circ}{t_3} - (\overset{\circ}{t_1} + k\times\rho)) > \left(\frac{E_{rated}}{p_w^{out}}\right) \\ Q_w(t) = p_w^{out}\times(\overset{\circ}{t_3} - (\overset{\circ}{t_1} + k\times\rho)), \text{ when } t^{rated} \le (\overset{\circ}{t_1} + k\times\rho) \text{ and } \\ \quad (\overset{\circ}{t_3} - (\overset{\circ}{t_1} + k\times\rho)) \le \left(\frac{E_{rated}}{p_w^{out}}\right) \end{cases} \quad 9\text{-}3$$

in equation set 9-3, k=0, 1, 2, 3 . . . , ∃k∈N; $t^{rated}$ denotes the time when the energy storage of the energy storage charging pile $j_w$ reaches the rated electricity quantity, and the definitions of other variables are the same as Equation 9-2 and its constraints:

announcing the corresponding allocable electric quantity $Q_w(t)$ at the time point $$(\overset{\circ}{t_1} + k \times \rho)$$

in the allocable electricity quantity idle period $$[\overset{\circ}{t_1}, t_2]$$

in the reserved service list of the energy storage charging pile $j_w$; announcing the rest of the time points according to the time point $$(\overset{\circ}{t_1} + k \times \rho).$$

The method for announcing the type of the idle period $$[\overset{\circ}{t_1}, t_2]$$

further includes: every time a Δt time passes, the dispatching system platform re-estimates the comprehensive energy storage electricity quantity $$\int_{\overset{\circ}{t_1}}^{t_2} p_{storage} \times d(t)$$

of the charging pile $j_w$ in Equation 9-1, re-estimates and announces the electricity quantity according to Equation 9-1, and updates the reserved service list of the charging pile $j_w$.

The method for announcing the allocable electricity quantity idle period of the energy storage charging pile $j_w$ further includes: every time a Δt time passes, the dispatching system platform re-estimates the comprehensive energy storage electricity quantity $$\int_{\overset{\circ}{t_1}}^{\overset{\circ}{t_1}+k\times\rho} p_{storage}(t) \times d(t)$$

and $$\int_{\overset{\circ}{t_3}}^{t_2} p_{storage} \times d(t)$$

of the charging pile $j_w$ in Equation 9-2 and its constraint $t_3$ $t_2$ conditions, re-estimates and announces the electricity quantity according to Equation 9-3, and updates the reserved service list of the charging pile $j_w$.

The present disclosure has the following beneficial effects.

1. The planning of the whole-journey electric-quantity-based path of the vehicle is realized, and the planned shortest feasible path meets the requirements of energy consumption saving, as well as the needs of users and low-carbon society.
2. Based on the energy storage prediction of the energy storage charging pile, the multi-user charging behavior of the energy storage charging pile and the discharging behavior of the energy storage charging pile are unified in the time dimension, and the multi-user reservation of the energy storage charging pile is realized.
3. The fused use of an energy storage charging pile and a power-grid direct-supply charging pile is realized using arrival time matching and energy time differentiation, which improves the integrity of the charging pile network and lays the foundation for fast charging network.
4. Charging scheduling is performed on the vehicle through the dispatching system platform. The original disorderly reservation specified by a user based on the pile position is upgraded to the unified planning and allocation by the scheduling platform based on the energy demand of the users in the whole network and the charging pile resources, and the users are subjected to mandatory scheduling, thus maximizing the resource utilization and meeting the driving needs of more vehicles.

correspond to the reserved charging start time and the reserved charging end time of the preceding vehicle $i_1$, respectively, $t_2$ and $$t_2^{\circ}$$

correspond to the reserved charging start time and the reserved charging end time of the preceding vehicle $i_2$, respectively; $TP_2$ is the reserved allocated electric quantity of the preceding vehicle $i_2$ that has reserved for charging in the period $$[t_2, t_2^{\circ}];$$

$E_{rated}$ is the rated electricity quantity of the energy storage battery of the energy storage charging pile; $E(t_1)$, $$E(t_1^{\circ})$$

and $E(t_2)$ correspond to the remaining electric quantity of the energy storage charging pile $j_w$ at the time $t_1$, $$t_1^{\circ}$$

and $t_2$.

Figure 2:
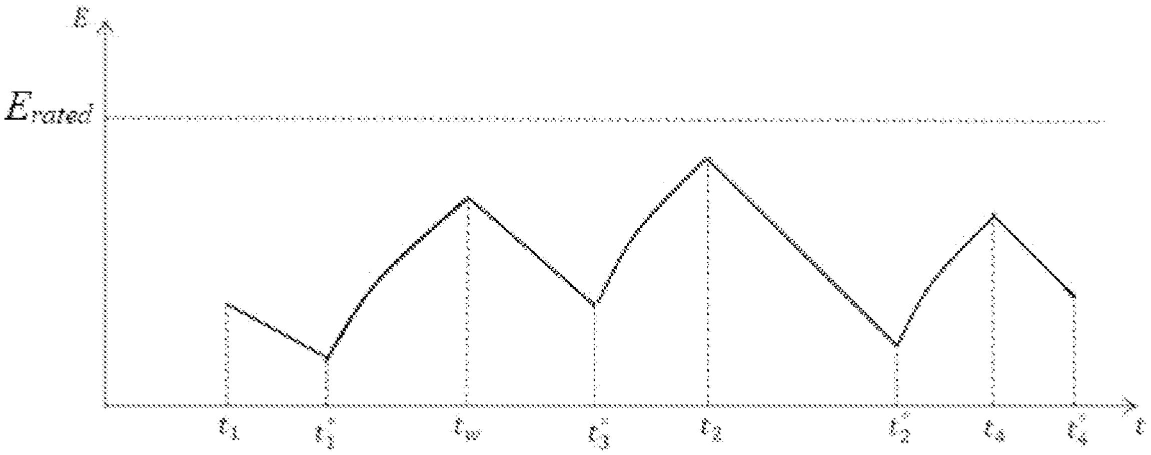

FIG. 2 is a schematic diagram of method 10 in Embodiment 2 of the present disclosure when the charging pile $j_w$ allows the electric vehicle i to jump a queue to reserve for charging in a finite allocable electricity quantity idle period $$[t_1^{\circ}, t_2];$$

in the figure, a vertical axis E denotes the remaining electric quantity of the energy storage charging pile, and the horizontal axis t denotes the time; $t_1$ and $$t_1^{\circ}$$

correspond to the reserved charging start time and the reserved charging end time of the preceding vehicle $i_1$, respectively, $t_2$ and $$t_2^{\circ}$$

correspond to the reserved charging start time and the reserved charging end time of the preceding vehicle $i_2$, respectively; $t_w$ is the estimated time when the electric vehicle i arrives at the charging pile $j_w$, $t_w$ is the estimated time when the electric vehicle i arrives at the charging pile $j_w$;

$$t_3^{\circ}$$

is the latest charging end time of the electric vehicle i when the charging pile $j_w$ allows the electric vehicle i to jump a queue for charging, $t_4$ and $$t_4^{\circ}$$

correspond to the reserved charging start time and the reserved charging end time of the preceding vehicle $i_4$, respectively; $E_{rated}$ is the rated electricity quantity of the energy storage battery of the energy storage charging pile.

Figure 3A:
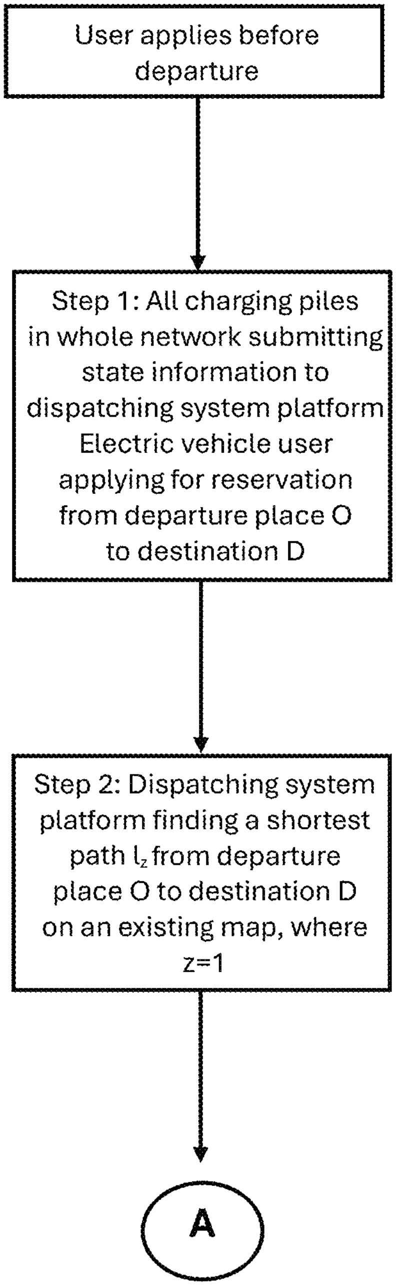
Figure 3B:
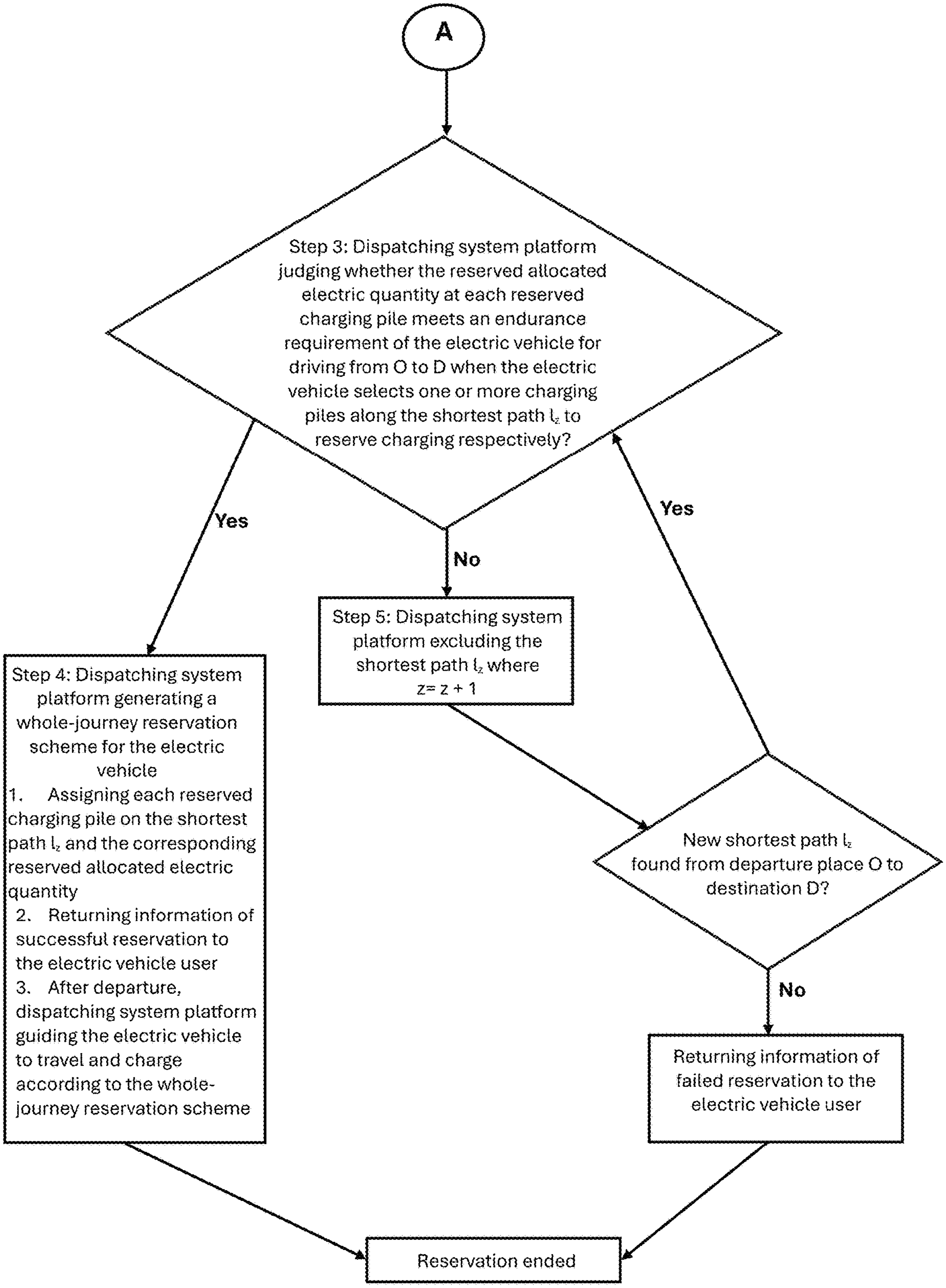

FIGS. 3A-3B is a flow diagram showing an electric-quantity-based path planning method for an electric vehicle compatible with an energy storage charging pile, wherein a power supply source of the energy storage charging pile is complementary energy storage for generating electricity from new energy or purchasing electricity from a power grid.

DETAILED DESCRIPTION OF THE EMBODIMENTS

In the following, the technical scheme of the present disclosure will be described in detail with specific embodiments and attached drawings, which does not limit the protection scope of the claims of the present disclosure.

Before explaining specific embodiments, methods 1 to 10 involved in specific embodiments of the present disclosure will be explained as follows.

Method 1: Method for Obtaining the Path Distance of Segments:

According to the received position coordinates of the charging piles, the dispatching system platform obtains all the charging piles distributed along the path $l_z$. Assuming that there are n charging piles, the directed sequence matrix of the n charging piles along the path $l_z$ from the departure place O is denoted as $(j_1, j_2, \ldots j_n)^T$. $(j_0, j_1, \ldots, j_n\ j_{n+1})^T$ is used to denote the segmented point directed sequence matrix of the path $l_z$ in which the departure place O, n charging piles distributed along the path and the destination D serve as the segmented points, where $j_0$ corresponds to the departure place O, and $j_{n+1}$ corresponds to the destination D.

The dispatching system platform obtains the path distance $(j_0, j_1, \ldots, j_n, j_{n+1})^T$ between two adjacent segmented points from the existing map respectively. The obtained segmented path distance is denoted by the directed sequence matrix $(dist_{0,1}, dist_{1,2}, \ldots dist_{n-1,n}, dist_{n,n+1})$, where $dist_{0,1}$ denotes the path distance from the departure place O to the first charging pile $j_1$, $dist_{1,2}$ denotes the path distance from the first charging pile $j_1$ to the second charging pile $j_2$, and so on, $dist_{n,n+1}$ denotes the path distance from the n-th charging pile $j_n$ to the destination D.

Method 2: Method for Estimating the Driving Time of the Segmented Path of the Electric Vehicle i:

According to Equation 2-1, the driving time $t_{w-1,w}$ of the segmented path of the electric vehicle i is estimated:

$$t_{w-1,w} = \frac{dist_{w-1,w}}{\overline{v_w}}, \forall w \in [1, n+1] \quad \text{2-1}$$

In Equation 2-1, $dist_{w-1,w}$ denotes the path distance from the segmented point $j_{w-1}$ to the segmented point $j_w$ obtained by the method 1. $\overline{v_w}$ denotes the average speed of the electric vehicle i from the segmented point $j_{w-1}$ to the segmented point $j_w$, $\overline{v_w}$ can be the average speed of the electric vehicle i passing through $dist_{w-1,w}$ in the historical statistical period extracted from traffic historical big data, or the average speed of all vehicles passing through $dist_{w-1,w}$ in the historical statistical period extracted from traffic historical big data, and the value of the historical statistical period is user-defined.

The driving time $t_{w-1,w}$ of the electric vehicle i can also be obtained directly from the existing GIS map.

Method 3: One of the Following Two Methods can be Selected to Estimate the Energy Consumption of the Segmented Path of the Electric Vehicle i:

Method A: the segmented path energy consumption of the electric vehicle i according to the following Equation 3-1:

$$EC_{w-1,w} = Aver \times dist_{w-1,w}, \forall w \in [1, n+1] \quad \text{3-1}$$

In Equation 3-1, $EC_{w-1,w}$ denotes the estimated energy consumption of the electric vehicle i from the segmented point $j_{w-1}$ to the segmented point $j_w$, and the segmented points $j_{w-1}$ and the segmented point $j_w$ are obtained by the method 1. $dist_{w-1,w}$ is defined as in Equation 2-1. Aver is the power consumption per unit mileage of the electric vehicle i.

The power consumption per unit mileage Aver is calculated according to Equation 3-2:

$$Aver = (m_{vehicle} + m_{negative})\varphi \quad \text{3-2}$$

In Equation 3-2, $m_{vehicle}$ is the body mass of the electric vehicle i, and $m_{negative}$ is the on-board mass of the electric vehicle i. If the vehicle type of the electric vehicle i is not a vehicle type reserved for the first time on the dispatching system platform, φ is the historical specific energy consumption coefficient of the electric vehicle i extracted from traffic historical big data by the dispatching system platform; if it is a vehicle type reserved for the first time, the specific energy consumption coefficient φ is calculated according to Equation 3-3.

$$\varphi = \frac{\text{bat\_cap}_i}{m_{vehicle} \times S_{max}} \quad \text{3-3}$$

In Equation 3-3, $S_{max}$ is the maximum endurance mileage of the model of the electric vehicle i provided by the manufacturer, $\text{bat\_cap}_i$ is the rated capacity of the power battery of the electric vehicle i, and $m_{vehicle}$ is defined as in Equation 3-2.

Method B: the segmented path energy consumption $EC_{w-1,w}$ of the electric vehicle i according to the following Equation 3-4:

$$EC_{w-1,w} = dist_{w-1,w} \times \text{kWh} \, \forall w \in [1, n+1] \quad \text{3-4}$$

In Equation 3-4, $EC_{w-1,w}$ is defined as in Equation 3-1, $dist_{w-1,w}$ is defined as in Equation 2-1, and kWh is the power consumption per 100 kilometers of the electric vehicle i, which can be obtained from factory parameters or from traffic history big data.

Method 4: The Charging Duration $$T_{w,i}^{charging}$$

of the Electric Vehicle i at the Charging Pile $j_w$ is Estimate According to the Following Equation 4-1:

In Equation 4-1, $$P_w^{out}$$

denotes the constant output power of the charging pile $j_w$, and $TP_w$ is the reserved allocated electric quantity of the electric vehicle i at the charging pile $j_w$ estimated by the method 10.

Method 5: The Queuing Charging Duration $$T_{w,i}^{queuing}$$

of the Electric Vehicle i at the Charging Pile $j_w$ is Estimated According to the Following Equation 5-1:

$$T_{w,i}^{queuing} = t_{w,i}^{charging} - t_w \quad \text{5-1}$$

In Equation 5-1, $$t_{w,i}^{charging}$$

is the reserved charging start time estimated by the method 10, $t_w$ is the time when the electric vehicle i arrives at the charging pile $j_w$ which is estimated by the method 6.

Method 6: The Time $t_w$ when the Electric Vehicle i Arrives at the Charging Pile $j_w$ is Estimated According to the Following Equation 6-1:

$$t_w = t_0 + \text{the sum of the pre-reserved charging duration} + \text{the sum of the pre-queuing charging duration} + t_{0,w} \forall w \in [1, n] \quad \text{6-1}$$

in Equation 6-1, $t_0$ denotes the departure time of the electric vehicle i; $t_{0,w}$ denotes the driving duration of the electric vehicle i along the path $l_z$ from the departure place O to the charging pile $j_w$; tow is obtained by estimating the driving time of each segmented path along the path $l_z$ from the departure place O to the charging pile $j_w$ by the method 2 and then accumulating the driving time; the sum of the pre-reserved charging duration refers to the sum of the reserved charging duration that has reserved for charging at other charging piles along the path when the electric vehicle i arrives at the charging pile $j_w$ along the path $l_z$ from the departure place O, and the charging durations of other charging piles along the path are obtained by the method 4, respectively; the sum of the pre-queuing charging duration refers to the sum of the queuing charging duration that has reserved for charging at other charging piles along the path when the electric vehicle i arrives at the charging pile $j_w$ along the path $l_z$ from the departure place O, and the queuing charging durations of other charging piles along the path are obtained by the method 5, respectively Method 7: The Remaining Electric Quantity $RE_i(t_w)$ of the Electric Vehicle i at the Time $t_w$ when the Electric Vehicle Arrives at the Charging Pile $j_w$ is Estimated According to the Following Equation 7-1:

$$RE_i(t_w) = bat\_cap_{str} + \text{the sum of the pre-reserved allocated electric quantity} - EC_{0,w}\forall\, w \in [1, n] \quad (7\text{-}1)$$

in Equation 7-1, $bat\_cap_{str}$ is an initial remaining electric quantity when the electric vehicle i departs: the sum of the pre-reserved allocated electric quantity refers to the sum of the electric quantity that has reserved for allocation at other charging piles along the path when the electric vehicle i arrives at the charging pile $j_w$ from the departure place O along the path $l_z$, and the reserved allocated electric quantity at other charging piles along the path is estimated by the method 10, respectively; $EC_{0,w}$ indicates the energy consumption of the electric vehicle i driving along the path $l_z$ from the departure place O to the charging pile $j_w$, and $EC_{0,w}$ is obtained by estimating the segmented path energy consumption of the electric vehicle i by the method 3 and then accumulating the energy consumption.

Method 8: The Comprehensive Energy Storage Electricity Quantity $E(t_2-t_1)$ of the Charging Pile $j_w$ is Estimated:

If the charging pile of the present disclosure is an energy storage charging pile, the power supply source of the energy storage charging pile is new energy power generation, including one or more of solar power generation and wind power generation, and may also include complementary energy storage for purchasing electricity from the power grid.

The comprehensive energy storage electricity quantity $E(t_2-t_1)$ of the charging pile $j_w$ is denoted by the following Equation 8-1:

$$E(t_2 - t_1) = \int_{t_1}^{t_2} p_{storage}(t) \times d(t) \quad (8\text{-}1)$$

The constraint condition of Equation 8-1 is: $(t_2-t_1) \le E_{rated}$; where $E_{rated}$ is the rated electricity quantity of the energy storage battery of the charging pile $j_w$; $t_1$ is the energy storage start time; $t_2$ is the energy storage end time; $p_{storage}(t)$ is the predicted energy storage power of the energy storage charging pile $j_w$ at the time t; if the power supply source of the energy storage charging pile is solar power generation, $p_{storage}(t)$ is the predicted output power of solar power generation at the time t, which is predicted by the prior art method; if the power supply source of the energy storage charging pile is wind power generation, $p_{storage}(t)$ is the predicted output power of wind power generation at the time t, which is predicted by the prior art method; if the power supply source of the energy storage charging pile is complementary energy storage for purchasing electricity from the power grid, $p_{storage}(t)$ is the constant output power of the power grid; if the power supply source of the energy storage charging pile is the combined power generation of multiple power supply sources from solar power generation, wind power generation or complementary energy storage for purchasing electricity from the power grid, $p_{storage}(t)$ is the output power of the combined power generation.

Because solar energy or wind power generation is closely related to weather, illumination and other factors, in order to improve the accuracy of estimation, every time a $\Delta t$ time passes, the dispatching system platform re-estimates the comprehensive energy storage electricity quantity $E(t_2-t_1)$ of the charging pile $j_w$.

Method 9: The Method for Announcing the Type of the Idle Period of the Charging Pile $j_w$ and the Corresponding Allocable Electric Quantity has the Following Steps:

(9.1) The energy storage charging pile $j_w$ establishes and stores a reserved service list, and the field contents of the reserved service list include an electric vehicle user name, an electric vehicle brand, an vehicle model, reserved charging start time and charging pile remaining electric quantity corresponding to the time, reserved charging end time and charging pile remaining electric quantity corresponding to the time, reserved allocated electric quantity, charging duration, a type of the idle periods and corresponding allocable electricity quantity.

(9.2) the idle period is divided into two types: the energy storage period and the allocable electric quantity idle period of the energy storage charging pile $j_w$. The type of the idle period and the corresponding allocable electric quantity are announced according to Step (9.3) or Step (9.4), respectively.

Figure 1:
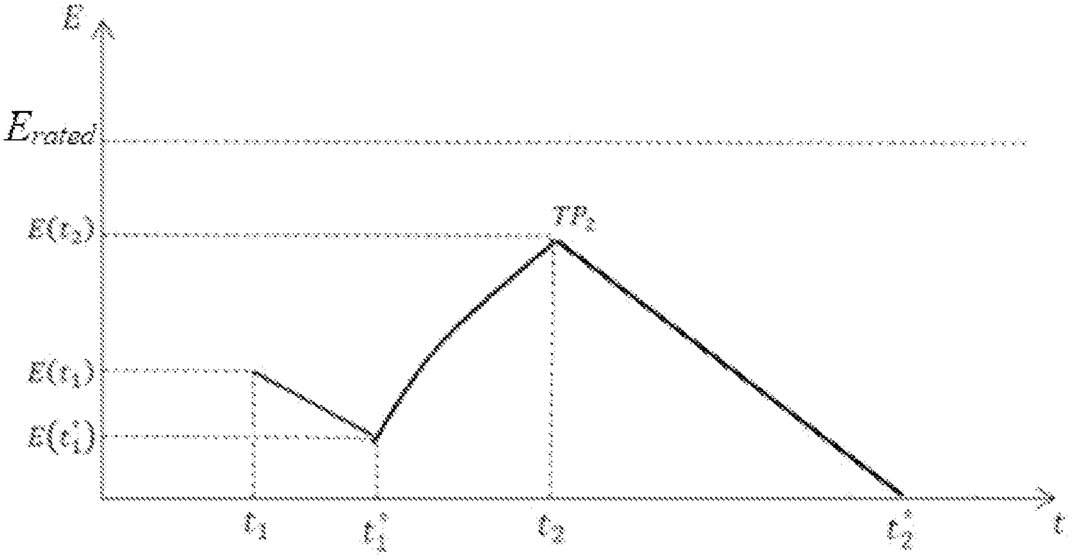
FIG. 1 is a schematic diagram showing that the idle period of an energy storage charging pile is the energy storage period of the energy storage charging pile according to the method 9 in Embodiment 5 of the present disclosure. In the figure, a vertical axis E denotes the remaining electric quantity of the energy storage charging pile, and the horizontal axis t denotes the time; $t_1$ and $$t_1^{\circ}$$

The energy storage period of the energy storage charging pile $j_w$ means that in order not to affect the charging amount of other vehicles that have reserved for charging after the energy storage period and the reserved charging start and end time, the electric vehicle charging cannot be arranged only as the energy storage period of this pile in the idle period, and the energy storage period of the energy storage charging pile $j_w$ includes the energy storage start time and the energy storage end time;

The allocable electricity quantity idle period is the remaining idle period of the energy storage charging pile $j_w$ after excluding the energy storage period from all idle periods in the reserved service list, including the charging start time and the charging end time of the electric vehicle in the allocable electricity quantity idle period:

(9.3) The method for announcing the energy storage period of the energy storage charging pile $j_w$ is as follows:

The reserved service list of the charging pile $j_w$ is searched for the idle period, as shown in FIG. 1. If vehicles have reserved for charging before and after the idle period $$[t_1^o, t_2],$$

if a preceding vehicle $i_1$ has reserved for charging in the period $$[t_1, t_1^\circ],$$

the reserved allocated electric quantity is $TP_1$: a preceding vehicle $i_2$ has reserved for charging in the period $$[t_2, t_2^\circ],$$

the reserved allocated electric quantity is $TP_2$; where $t_1$ and $$t_1^\circ$$

correspond to the reserved charging start time and the reserved charging end time of the preceding vehicle $i_1$ respectively, and where $t_2$ and $$t_2^\circ$$

correspond to the reserved charging start time and the reserved charging end time of the preceding vehicle $i_2$ respectively;

$$t_1 < t_1^\circ < t_2 < t_2^\circ.\ E(t_1), E(t_1^\circ), E(t_2) \text{ and } E(t_2^\circ)$$

correspond to the estimated remaining electric quantity of the charging pile $j_w$ at the time $$t_1, t_1^\circ, t_2 \text{ and } t_2^\circ.$$

When the following Equation 9-1 is met, $$[t_1^\circ, t_2]$$

is announced to be the energy storage period of the energy storage charging pile $j_w$. No vehicle can be reserved for charging or be charged in this energy storage period. Δt this time, $$t_1^\circ$$

is the energy storage start time of the energy storage charging pile $j_w$, and $t_2$ is the energy storage end time of the energy storage charging pile $j_w$.

$$\begin{cases} 0 \le E(t_2) \le E_{rated} \text{ and } E(t_2) = TP_2 \\ E(t_2) = E(t_1^\circ) + \int_{t_1^\circ}^{t_2} p_{storage}(t) \times d(t) \\ t_1 < t_1^\circ < t_2 < t_2^\circ \end{cases} \quad 9\text{-}1$$

in Equation 9-1, $E_{rated}$ is the rated electricity quantity of the energy storage battery of the energy storage charging pile $j_w$; $p_{storage}(t)$ is the predicted energy storage power of the energy storage charging pile $j_w$ at the time t, which is predicted by the prior art method as in the method 8.

Every time a Δt time passes, the dispatching system platform re-estimates the comprehensive energy storage electricity quantity $$\int_{t_1^\circ}^{t_2} p_{storage}(t) \times d(t)$$

of the charging pile $j_w$ in Equation 9-1, re-estimates and announces the electricity quantity according to Equation 9-1, and updates the reserved service list of the charging pile $j_w$.

(9.4) The method for announcing the allocable electric quantity idle period of the energy storage charging pile $j_w$ includes the following steps.

First, all the idle periods in the reserved service list of the energy storage charging pile $j_w$ are searched for, and after excluding the energy storage period announced in Step (9.3), the remaining periods are the allocable electricity quantity idle periods.

Second, the allocable electric quantity idle period is divided into time points according to a fixed duration ρ, where ρ is a user-defined constant. If there is an allocable electric quantity idle period is 9:00-10:15 and p is user-defined for 30 minutes, the period can be divided into four time points, namely 9:00, 9:30, 10:00 and 10:15. The latest charging end time of the electric vehicle at each time point and the allocable electric quantity can be announced respectively. The announcing method is as follows.

The allocable electric quantity idle period is set as $$[t_1^\circ, t_2],$$

which can be divided into several time points $$t_1^\circ, (t_1^\circ + \rho), (t_1^\circ + 2\times\rho), \ldots\ t_1^\circ + k\times\rho, (t_1^\circ + (k+1)\times\rho), \ldots\ \ldots\ t_2, k = 0, 1, 2, 3\ \ldots\ ., \exists k \in N,$$

and the reserved charging start time of the electric vehicle in the allocable electric quantity idle period is set as the time point $$(t_1^\circ + k\times\rho).$$

Assuming that vehicles have reserved for charging before and after the allocable electric quantity idle period $$[t_1^\circ, t_2],$$

if a preceding vehicle $i_1$ has reserved for charging in the period $$[t_1, \overset{\circ}{t_1}],$$

the reserved allocated electric quantity is $$TP_1 = E(\overset{\circ}{t_1}) - E(t_1);$$

if other preceding vehicles $i_2$ have reserved for charging in the period $$[t_2, \overset{\circ}{t_2}],$$

the reserved allocated electric quantity is $$TP_2 = E(\overset{\circ}{t_2}) - E(t_2);$$

where $t_1$ and $$\overset{\circ}{t_1}$$

correspond to the reserved charging start time and the reserved charging end time of the preceding vehicle $i_1$ respectively, and where $t_2$ and $$\overset{\circ}{t_2}$$

correspond to the reserved charging start time and the reserved charging end time of other preceding vehicles $i_2$ respectively;

$$t_1 < \overset{\circ}{t_1} < t_2 < \overset{\circ}{t_2};\ E(t_1).\ E(\overset{\circ}{t_1}),\ E(t_2) \text{ and } E(\overset{\circ}{t_2})$$

correspond to the estimated remaining electric quantity of the charging pile $j_w$ at the time $$t_1, \overset{\circ}{t_1}, t_2 \text{ and } \overset{\circ}{t_2}.$$

The allocable electricity quantity idle period of the energy storage charging pile $j_w$ must meet the following Equation 9-2:

$$TP_2 \le E(\overset{\circ}{t_1}) + \int_{\overset{\circ}{t_1}}^{\overset{\circ}{t_1}+k\times\rho} p_{storage}(t)\times d(t) - P_w^{out}\times\left(\overset{\circ}{t_3} - \left(\overset{\circ}{t_1} + k\times\rho\right)\right) + \int_{\overset{\circ}{t_3}}^{t_2} p_{storage}(t)\times d(t) \quad \text{9-2}$$

The constraint condition of Equation 9-2 is:

$$\begin{cases} 0 \le E(\overset{\circ}{t_2}) \le E_{rated} \\ 0 \le E(t_2) \le E_{rated} \\ 0 \le E(\overset{\circ}{t_1}) + \int_{\overset{\circ}{t_1}}^{\overset{\circ}{t_1}+k\times\rho} p_{storage}(t)\times d(t) \le E_{rated} \\ P_w^{out}\times\left(\overset{\circ}{t_3} - \left(\overset{\circ}{t_1} + k\times\rho\right)\right) \le E(\overset{\circ}{t_1}) + \int_{\overset{\circ}{t_1}}^{\overset{\circ}{t_1}+k\times\rho} p_{storage}(t)\times d(t) \\ t_1 < \overset{\circ}{t_1} \le \left(\overset{\circ}{t_1} + k\times\rho\right) < \overset{\circ}{t_3} < t_2 < \overset{\circ}{t_2} \end{cases}$$

In Equation 9-2 and its constraint conditions, $p_{storage}(t)$ is the predicted energy storage power of the energy storage charging pile $j_w$ at the time t, which is predicted by the prior art method as in the method 8;

$$P_w^{out}$$

is a constant output power of the charging pile $j_w$; $E_{rated}$ is the rated electricity quantity of the energy storage battery of the energy storage charging pile $j_w$.

The latest charging end time $$\overset{\circ}{t_3}$$

of the electric vehicle can be obtained from Equation 9-2 and its constraint conditions, $$\left[\overset{\circ}{t_3}, t_2\right]$$

is the energy storage period of the energy storage charging pile $j_w$.

The corresponding allocable electric quantity $Q_w(t)$ of the energy storage charging pile $j_w$ at the time point $$\left(\overset{\circ}{t_1} + k\times\rho\right)$$

in the allocable electricity quantity idle period $$\left[\overset{\circ}{t_1}, t_2\right]$$

is estimated according to the following equation set 9-3:

$$\begin{cases} Q_w(t) = E(\overset{\circ}{t_1}) + \int_{\overset{\circ}{t_1}}^{\overset{\circ}{t_1}+k\times p} p_{storage}(t)\times d(t), \text{ when } \left(\overset{\circ}{t_1} + k\times\rho\right) < t^{rated} \\ Q_w(t) = E_{rated}, \text{ when } t^{rated} \le \left(\overset{\circ}{t_1} + k\times\rho\right) < \overset{\circ}{t_3} \text{ and } \left(\overset{\circ}{t_3} - \left(\overset{\circ}{t_1} + k\times\rho\right)\right) > \left(\frac{E_{rated}}{p_w^{out}}\right) \\ Q_w(t) = p_w^{out}\times\left(\overset{\circ}{t_3} - \left(\overset{\circ}{t_1} + k\times\rho\right)\right), \text{ when } t^{rated} \le \left(\overset{\circ}{t_1} + k\times\rho\right) \text{ and } \left(\overset{\circ}{t_3} - \left(\overset{\circ}{t_1} + k\times\rho\right)\right) \le \left(\frac{E_{rated}}{p_w^{out}}\right) \end{cases} \quad \text{9-3}$$

In equation set 9-3, k=0, 1, 2, 3 . . . , ∃k∈N; $t^{rated}$ denotes the time when the energy storage of the energy storage charging pile $j_w$ reaches the rated electricity quantity, and the definitions of other variables are the same as Equation 9-2 and its constraints.

The corresponding allocable electric quantity $Q_w(t)$ at the time point $$(\overset{\circ}{t_1} + k \times \rho)$$

in the allocable electricity quantity idle period $$[\overset{\circ}{t_1}, t_2]$$

is announced in the reserved service list of the energy storage charging pile $j_w$. The rest of the time points are announced according to the method announced at the time point $$(\overset{\circ}{t_1} + k \times \rho).$$

Every time a Δt time passes, the dispatching system platform re-estimates the comprehensive energy storage electricity quantity $$\int_{\overset{\circ}{t_1}}^{\overset{\circ}{t_1}+k\times\rho} p_{storage}(t) \times d(t) \text{ and } \int_{\overset{\circ}{t_3}}^{t_2} p_{storage}(t) \times d(t)$$

of the charging pile $j_w$ in Equation 9-2, re-estimates and announces the electricity quantity according to Equation 9-2 and its constraint conditions, and Equation 9-3, and updates the reserved service list of the charging pile $j_w$.

Method 10; the Allocable Electric Quantity $Q_w(i)$ that the Charging Pile $j_w$ can Supply to the Electric Vehicle i, the Reserved Charging Start Time $$t_{w,i}^{charging}$$

of the Electric Vehicle i at the Charging Pile $j_w$, the Reserved Charging Duration $$T_{w,i}^{charging}$$

of the Electric Vehicle i at the Charging Pile $j_w$, and the Reserved Allocable Electricity Quantity $TP_w$ of the Electric Vehicle i at the Charging Pile $j_w$ are Estimated, Respectively:

Estimation method 1; when the charging pile $j_w$ is an energy storage charging pile, the specific steps of the estimation method are as follows.

(10-1-1), a queuing time limit σ after the time $t_w$ when the electric vehicle i arrives at the charging pile $j_w$ is set first, where σ is a user-defined time value.

(10-1-2), the reserved service list of the charging pile $j_w$ is searched for the idle period of the charging pile $j_w$ between $t_w$ and $t_w+\sigma$. According to the types of the idle periods announced in the Method 9, if all the found types of the idle periods are energy storage periods, the allocable electricity quantity that the charging pile $j_w$ can supply to the electric vehicle i is $Q_w(i)=0$. The charging pile $j_w$ is incapable of reserving for charging the electric vehicle i, that is, the reserved allocated electricity quantity $TP_w=0$; if the found idle period type is an allocable electricity quantity idle period, proceed to Step (10-1-3).

(10-1-3), the reserved service list of the charging pile $j_w$ is searched for the allocable electricity quantity idle period. Assuming that the preceding vehicle $i_1$ has reserved for charging in a period $$[t_1, \overset{\circ}{t_1}]$$

before the allocable electricity quantity idle period, where $t_1$ and $$\overset{\circ}{t_1}$$

correspond to the reserved charging start time and the reserved charging end time of the preceding vehicle $i_1$ respectively, $E(t_1)$ and $$E(\overset{\circ}{t_1})$$

correspond to the remaining electric quantity of the charging pile $j_w$ at the time $$t_1 \text{ and } \overset{\circ}{t_1},$$

and the reserved allocated electric quantity of the preceding vehicle $i_1$ is $$TP_1 = E(\overset{\circ}{t_1}) - E(t_1),$$

There is no vehicle reserving for charging after $$\overset{\circ}{t_1},$$

that is, the allocable electricity quantity idle period is infinite, which is denoted as $$[\overset{\circ}{t_1}, \infty).$$

If the allocable electricity quantity idle period is not infinite, proceed to Step (10-1-4).

The reserved charging start time $$t_{w,i}^{charging}$$

of the electric vehicle i at the charging pile $j_w$ is estimated according to the following Equation 10-1:

$$t_{w,i}^{charging} = \max(\mathring{t}_1, t_w) \quad 10\text{-}1$$

The allocable electricity quantity $$Q_w(t_{w,i}^{charing})$$

of the charging pile $j_w$ in the allocable electricity quantity idle period $$[\mathring{t}_1, \infty)$$

is estimated according to the following equation set $$\begin{cases} Q_w(t_{w,i}^{charging}) = E(\mathring{t}_1) + \int_{\mathring{t}_1}^{t_{w,i}^{charging}} p_{stroage}(t) \times d(t), \text{ when } \mathring{t}_1 \le t_{w,i}^{charging} \le t^{rated} \\ Q_w(t_{w,i}^{charging}) = E_{rated} \text{ when } t_{w,i}^{charging} > t^{rated} \end{cases} \quad 10\text{-}2$$

The constraint condition of the equation set 10-2 is as follows:

$$0 \le E(\mathring{t}_1) + \int_{\mathring{t}_1}^{t_{w,i}^{charging}} p_{stroage}(t) \times d(t) \le E_{rated}$$

The reserved allocable electricity quantity $TP_w$ of the charging pile $j_w$ in the period $$[\mathring{t}_1, \infty)$$

is estimated according to the following equation set 10-3;

$$TP_w = \min(Q_w(t_{w,i}^{charging}), (\text{bat\_cap}_i - RE_i(t_w))) \quad 10\text{-}3$$

The reserved charging duration $$T_{w,i}^{charging}$$

of the electric vehicle i at the charging pile $j_w$ is estimated according to the following Equation 10-4:

$$T_{w,i}^{charging} = TP_w \div P_w^{out} \quad 10\text{-}4$$

The remaining electric quantity of the reserved charging start time $$t_{w,i}^{charging}$$

corresponding to the charging pile $j_w$ is $$E(t_{w,i}^{charging}) = Q_w(t_{w,i}^{charging}),$$

the remaining electric 1 quantity of the reserved charging end time $$(t_{w,i}^{charging} + T_{w,i}^{charging})$$

corresponding to the charging pile $j_w$ is $$E(t_{w,i}^{charging} + T_{w,i}^{charging}) = E(t_{w,i}^{charging}) - TP_w.$$

The above variables in the equations in Step (10-1-3) are defined as follows:

$$t_{w,i}^{charging}$$

is the reserved charging start time of the electric vehicle i at the charging pile $j_w$; $t_w$ is the estimated time when the electric vehicle i arrives at the charging pile $$j_w; Q_w(t_{w,i}^{charging})$$

is the estimated allocable electricity quantity of the charging pile $j_w$ in $$[\mathring{t}_1, \infty);$$

$$E(\mathring{t}_1)$$

is the estimated remaining electric quantity of the charging pile $j_w$ at the reserved charging end time $$\mathring{t}_1$$

corresponding to the preceding vehicle $i_1$; $p_{storage}(t)$ is the predicted energy storage power of the charging pile $j_w$ at the corresponding time t, which is predicted by the prior art method as in the method 8:

$$\int_{t_1^{\circ}}^{t_1^{\circ}+k\times p} p_{storage}(t)\times d(t)$$

is the predicted comprehensive energy storage electricity quantity of the charging pile $j_w$ at the period $$[t_1^{\circ}, t_{w,i}^{charging}]$$

as in the method 8;

$$P_w^{out}$$

is a constant output power of the charging pile $j_w$; $E_{rated}$ is the rated electricity quantity of the energy storage battery of the charging pile $j_w$; $t^{rated}$ is the time when the energy storage of the charging pile $j_w$ reaches the rated electricity quantity $E_{rated}$ in $$[t_1^{\circ}, \infty);$$

$bat\_cap_i$ is the rated electricity quantity of the power battery of the electric vehicle i, $RE_i(t_w)$ is the estimated remaining electric quantity of the electric vehicle i at the time $t_w$ when the electric vehicle arrives at the charging pile $j_w$; $TP_w$ is the reserved allocated electricity quantity of the electric vehicle i in $$[t_1^{\circ}, \infty)$$

of the charging pile $j_w$;

$$T_{w,i}^{charging}$$

is the reserved charging duration of the electric vehicle i at the charging pile $j_w$.

(10-1-4), as shown in FIG. 2, assuming that the preceding vehicle $i_1$ has reserved for charging at the charging pile $j_w$ in the period $$[t_1, t_1^{\circ}],$$

the reserved allocated electric quantity is $TP_1$; assuming that the preceding vehicle $i_2$ has reserved for charging at the charging pile $j_w$ in the period $$[t_2, t_2^{\circ}],$$

the reserved allocated electric quantity is $TP_2$; where $t_1$ and $$t_1^{\circ}$$

correspond to the reserved charging start time and the reserved charging end time of the preceding vehicle $i_1$, respectively, $t_2$ and $$t_2^{\circ}$$

correspond to the reserved charging start time and the reserved charging end time of the preceding vehicle $i_2$, respectively;

$$t_1 < t_1^{\circ} < t_2 < t_2^{\circ};\ E(t_1),\ E(t_1^{\circ}),\ E(t_2) \text{ and } E(t_2^{\circ})$$

correspond to the estimated remaining electric quantity of the charging pile $j_w$ at the time $$t_1,\ t_1^{\circ},\ t_2 \text{ and } t_2^{\circ},$$

which are obtained by searching the reserved service list of the charging pile $j_w$. The precondition for the charging pile $j_w$ to allow the electric vehicle i to jump a queue to reserve for charging in the allocable electricity quantity idle period $$[t_1^{\circ}, t_2]$$

is to not affect the reserved allocated electricity quantity and the reserved charging start and end time of other preceding vehicles that have already reserved for charging after this period $$[t_1^{\circ}, t_2],$$

as shown in the method 9, that is, the charging and discharging of the charging pile $j_w$ in the reserved charging period $$[t_2, t_2^{\circ}]$$

must first meet the following Equation 10-5:

$$TP_2 \le E(t_1^{\circ}) + \int_{t_1^{\circ}}^{t_{w,i}^{charging}} p_{storage}(t)\times d(t) - P_w^{out}\times\left(t_3^{\circ} - t_{w,i}^{charging}\right) + \int_{t_3^{\circ}}^{t_2} p_{storage}(t)\times d(t) \quad \text{10-5}$$

The constraint condition of Equation 10-5 is:

$$\begin{cases} E(t_1^{\circ}) + \int_{t_1^{\circ}}^{t_{w,i}^{charging}} p_{storage}(t) \times d(t) - P_w^{out} \times \left(t_3^{\circ} - t_{w,i}^{charging}\right) + \int_{t_3^{\circ}}^{t_2} p_{storage}(t) \times d(t) \leq E_{rated} \\ 0 \leq E(t_1^{\circ}) + \int_{t_1^{\circ}}^{t_{w,i}^{charging}} p_{storage}(t) \times d(t) \leq E_{rated} \\ P_w^{out} \times \left(t_3^{\circ} - t_{w,i}^{charging}\right) \leq E(t_1^{\circ}) + \int_{t_1^{\circ}}^{t_{w,i}^{charging}} p_{storage}(t) \times d(t) \\ t_1 < t_1^{\circ} \leq t_{w,i}^{charging} < t_3^{\circ} < t_2 < t_2^{\circ} \end{cases}$$

According to Equation 10-5 and its constraint condition, the latest charging end time $$t_3^{\circ}$$

of the electric vehicle i can be calculate when the charging pile $j_w$ allows the electric vehicle i to jump a queue for charging in the reserved charging period $$[t_1^{\circ}, t_2].$$

The allocable electric quantity $$Q_w\left(t_{w,i}^{charging}\right)$$

of the charging pile $j_w$ in the allocable electric quantity idle period $$[t_1^{\circ}, t_2]$$

is estimated according to the following equation set 10-6:

$$\begin{cases} Q_w\left(t_{w,i}^{charging}\right) = E(t_1^{\circ}) + \int_{t_1^{\circ}}^{t_{w,i}^{charging}} p_{storage}(t) \times d(t), \text{ when } t_{w,i}^{charging} \leq t^{rated} \\ Q_w\left(t_{w,i}^{charging}\right) = E_{rated}, \text{ when } t^{rated} \leq t_{w,i}^{charging} < t_3^{\circ} \text{ and } \left(t_3^{\circ} - t_{w,i}^{charging}\right) > \left(\frac{E_{rated}}{P_w^{out}}\right) \\ Q_w\left(t_{w,i}^{charging}\right) = P_w^{out} \times \left(t_3^{\circ} - t_{w,i}^{charging}\right), \text{ when } t^{rated} \leq t_{w,i}^{charging} < t_3^{\circ} \text{ and } \left(t_3^{\circ} - t_{w,i}^{charging}\right) \leq \end{cases} \quad \text{10-6}$$

In the Equation 10-5 and Equation 10-6, estimating the reserved charging start time $$t_{w,i}^{charging}$$

of the electric vehicle i at the charging pile $j_w$ according to the following Equation 10-7:

$$t_w^{charging} = \max(t_1^{\circ}, t_w) \quad \text{10-7}$$

$$Q_w\left(t_{w,i}^{Charging}\right)$$

is obtained according to Equation 10-6, and the reserved allocated electric quantity $TP_w$ of the electric vehicle i at the charging pile $j_w$ is estimated according to the following Equation 10-8:

$$TP_w = \min\left(Q_w\left(t_{w,i}^{charging}\right), (\text{bat\_cap}_i - RE_i(t_w))\right) \quad \text{10-8}$$

$TP_w$ is obtained according to Equation 10-8, and the reserved allocated charging duration $$T_{w,i}^{charging}$$

of the electric vehicle i at the charging pile $j_w$ is estimated according to the following Equation 10-8:

$$T_{w,i}^{charging} = TP_w \div P_w^{out} \quad \text{10–9}$$

If there are other preceding vehicles that reserve for charging at the charging pile $j_w$ before the electric vehicle i, but the time for reserving for charging is after the period $$[t_2, t_2^{\circ}]$$

of the preceding vehicle $i_2$ reserved for charging, the condition for the charging pile $j_w$ to allow the electric vehicle i to jump a queue to reserve for charging in the allocable electricity quantity idle period $$[t_1^{\circ}, t_2]$$

is that in addition to ensuring that the reserved allocated electricity quantity $TP_2$ of the preceding vehicle $i_2$ in the reserved charging period $$[t_2, \mathring{t}_2]$$

remains unchanged, it is also necessary to ensure that the reserved start and end time and the reserved allocated electricity quantity of all other preceding vehicles remain unchanged, and the specific methods are as follows.

Assuming that there are other preceding vehicles 14 that reserve for charging in the period $$[t_4, \mathring{t}_4]$$

before the electric vehicle i, $t_4$ and $$\mathring{t}_4$$

correspond to the reserved charging start time and the reserved charging end time of the preceding vehicle $i_4$, respectively. The reserved allocated electric quantity is $TP_4$, in which $$t_2 < \mathring{t}_2 < t_4 < \mathring{t}_4,$$

$TP_w$ also meets the following Equation 10-10:

$$TP_4 \le E(\mathring{t}_1) + \int_{\mathring{t}_1}^{t_{w,i}^{charging}} p_{storage}(t) \times d(t) - TP_w + \int_{t_{w,i}^{charging}+T_{w,i}^{charging}}^{t_2} p_{storage}(t) \times d(t) - TP_2 + \int_{\mathring{t}_2}^{t_4} p_{storage}(t) \times d(t) \qquad \text{10-10}$$

If $TP_w$ does not meet Equation 10-10, $TP_w$ is reduced, and the corresponding $$T_{w,i}^{charging}$$

is also reduced according to Equation 10-9 but $$t_{w,i}^{charging}$$

remains unchanged until Equation 10-10 is met.

If after the reserved charging period $$[t_4, \mathring{t}_4]$$

of the preceding vehicle $i_4$, there are other preceding vehicles is, $i_6$ . . . reserving for charging at the charging pile $j_w$ before the electric vehicle i, the preceding vehicles are processed according to the method of the preceding vehicle $i_4$ respectively until $TP_w$ can ensure that the reserved allocated electric quantity of all other preceding vehicles $i_2$, $i_4$, $i_5$, $i_6$ . . . remain unchanged. If $TP_w$ is reduced to the preset threshold value, but it is not ensured that the reserved allocated electric quantity of all other preceding vehicles remain unchanged, and the charging pile $j_w$ does not allow the electric vehicle i to jump a queue for reserved charging in the idle period $$[\mathring{t}_1, t_2],$$

that is, assuming that the reserved allocated electric quantity is $TP_w$=0.

If the final $TP_w \neq 0$, the remaining electric quantity of the charging pile $j_w$ charging is corresponding to the reserved charging start time $$t_{w,i}^{charging}$$

is $$E(t_{w,i}^{charging}) = E(\mathring{t}_1) + \int_{\mathring{t}_1}^{t_{w,i}^{charging}} p_{storage}(t) \times d(t),$$

and the remaining electric quantity of the charging pile $j_w$ corresponding to the reserved charging end time $$(t_{w,i}^{charging} + T_{w,i}^{charging}) \text{ is } E(t_{w,i}^{charging} + T_{w,i}^{charging}) = E(t_{w,i}^{charging}) - TP_w.$$

The above variables in the equations in Step (10-1-4) are defined as follows: $TP_2$ is the reserved allocated electricity quantity of the preceding vehicle $i_2$ in the reserved charging period $$[t_2, \mathring{t}_2];$$

$$E(\mathring{t}_1)$$

is the remaining electric quantity of the charging pile $j_w$ at the reserved charging end time $$\mathring{t}_1$$

corresponding to the preceding vehicle $i_1$; $p_{storage}$(t) is the predicted energy storage power of the charging pile $j_w$ at the corresponding time t, which is predicted by the prior art method;

$$P_w^{out}$$

is a constant output power of the charging pile $j_w$;

$$t_{w,i}^{charging}$$

is the reserved charging start time of the electric vehicle i at the charging pile $j_w$; $t_w$ is the estimated time when the electric vehicle i arrives at the charging pile $j_w$; $E_{rated}$ is the rated electricity quantity of the energy storage battery of the charging pile $j_w$;

$$t_3^{\circ}$$

is the latest charging end time of the electric vehicle i when the charging pile $j_w$ allows the electric vehicle i to jump a queue for charging, and $$Q_w\left(t_{w,i}^{charging}\right)$$

is the estimated allocable electric quantity of the charging pile $j_w$ in $$[t_1^{\circ}, t_2];$$

$t^{rated}$ is the time when the energy storage of the charging pile $j_w$ reaches the rated electricity quantity $E_{rated}$ in $$[t_1^{\circ}, \infty);$$

$bat\_cap_i$ is the rated electricity quantity of the power battery of the electric vehicle i, $RE_i(t_w)$ is the estimated remaining electric quantity of the electric vehicle i at the time $t_w$ when the electric vehicle arrives at the charging pile $j_w$; $TP_w$ is the reserved allocated electricity quantity of the electric vehicle i in $$[t_1^{\circ}, \infty)$$

of the charging pile $j_w$;

$$t_{w,i}^{charging}$$

is the reserved charging duration of the electric vehicle i at the charging pile $j_w$; $TP_4$ is the reserved allocated electric quantity of the preceding vehicle $i_4$ in the period $$[t_4^{\circ}, t_4^{\circ}].$$

(10-1-5), every time a $\Delta t$ time passes, the dispatching system platform executes from Step (10-1-2) to Step (10-1-4) according to the re-updated reserved service list of the charging pile $j_w$, and re-estimates the reserved allocated electric quantity $TP_w$.

Estimation method 2; when the charging pile $j_w$ is a power-grid direct-supply charging pile, the specific estimation method is as follows.

(10-2-1), a queuing time limit $\sigma$ after the time $t_w$ when the electric vehicle i arrives at the charging pile $j_w$ is set first, where $\sigma$ is a user-defined time value. The definitions of the following variables are the same as those of estimation method 1.

(10-2-2), according to a reserved service list of the charging pile $j_w$, finding whether there is an idle period between the time $t_w$ and the time two when the electric vehicle i arrives at the charging pile $j_w$; wherein if there is no idle period, estimating the allocable electric quantity $Q_w(i)=0$ that the charging pile $j_w$ is capable of supplying to the electric vehicle i; that is, the reserved allocated electricity quantity $TP_w=0$ of the electric vehicle i at the charging pile $j_w$. If there is an idle period, proceed to Step (10-2-3).

(10-2-3), if the idle period is infinite as in Step (10-1-3), the idle period is denoted as $$[t_1^{\circ}, \infty),$$

where $$t_1^{\circ}$$

corresponds to the reserved charging end time of the preceding vehicle $i_1$ and there is no other preceding vehicle reserved for charging after $$t_1^{\circ}.$$

It is estimated that the allocable electricity quantity $Q_w$ (i) that the charging pile $j_w$ can supply to the electric vehicle i is infinite.

The reserved allocated electric quantity $TP_w$ of the electric vehicle i at the charging pile $j_w$ is estimated according to Equation 10-11:

$$TP_w = \text{bat\_cap}_i - RE_i(t_w) \qquad 10\text{-}11$$

In Equation 10-11, $bat\_cap_i$ is the rated electricity quantity of the power battery of the electric vehicle i, $RE_i(t_w)$ is the estimated remaining electric quantity of the electric vehicle i at the time $t_w$ when the electric vehicle arrives at the charging pile $j_w$:

The reserved charging start time of the electric vehicle i at the charging pile $j_w$ is $$t_{w,i}^{charging} = \max(t_1^{\circ}, t_w).$$

The reserved charging duration is $$T_{w,i}^{charging} = TP_w \div P_w^{out}.$$

(10-2-4), if the idle period is finite and is $$[\mathring{t}_1, t_2],$$

assuming that the preceding vehicle $i_1$ has reserved for charging at the charging pile $j_w$ in the period $$[t_1, \mathring{t}_1],$$

and the reserved allocated electric quantity is $TP_1$; there is a preceding vehicle $i_2$ that has reserved for charging at the charging pile $j_w$ in the period $$[t_2, \mathring{t}_2],$$

and the reserved allocated electric quantity is $TP_2$; where $t_1$ and $$\mathring{t}_1$$

correspond to the reserved charging start time and the reserved charging end time of the preceding vehicle $i_1$, respectively, $t_2$ and $$\mathring{t}_2$$

correspond to the reserved charging start time and the reserved charging end time of the preceding vehicle $i_2$, respectively;

$$t_1 < \mathring{t}_1 < t_2 < \mathring{t}_2.$$

The idle periods of the power-grid direct-supply charging piles are all rechargeable periods of the electric vehicles, so that the allocable electric quantity $Q_w(i)$ that the charging piles $j_w$ can supply to the electric vehicles i is replaced by the rechargeable periods $$[\mathring{t}_1, t_2]$$

of the charging pile $j_w$.

The reserved allocated electric quantity $TP_w$ of the electric vehicle i at the charging pile $j_w$ is estimated according to the following Equation 10-12:

$$TP_w = \min\{(\text{bat\_cap}_i - RE_i(t_w)), P_w^{out} \times (t_2 - t_{w,i}^{charging})\} \quad 10\text{-}12$$

In Equation 10-12, $\text{bat\_cap}_i$ is the rated electricity quantity of the power battery of the electric vehicle i, $RE_i(t_w)$ is the estimated remaining electric quantity of the electric vehicle i at the time $t_w$ when the electric vehicle arrives at the charging pile $j_w$;

$$P_w^{out}$$

is a constant output charging is the reserved charging start time of the electric vehicle power of the charging pile $j_w$;

$$t_{w,i}^{charging}$$

is the reserved charging start time of the electric vehicle i at the charging pile $j_w$.

The reserved charging duration of the electric vehicle i at the charging pile $j_w$ is $$T_{w,i}^{charging} = t_2 - t_{w,i}^{charging}.$$

Through this method, the fused use of an energy storage charging pile and a power-grid direct-supply charging pile is realized using arrival time matching and energy time differentiation, which improves the integrity of the charging pile network and lays the foundation for fast charging network.

Embodiment 1

Embodiment 1, as follows, utilizes the method disclosed in FIGS. 3A-3B. The types of the charging piles in the whole road network of this embodiment include the existing energy storage charging piles, and can also include the existing power-grid direct-supply charging piles directly supplied by the power grid to the electric vehicles for charging. The power supply source of the energy storage charging pile can be one or more of new energy generation or complementary energy storage for purchasing electricity from the power grid. The new energy generation includes solar power generation and wind power generation. The electric vehicle carries out direct current charging through the energy storage charging pile, which is referred to as fast charging for short. A control module for automatically switching working modes is arranged in the energy storage charging pile. When an electric vehicle is connected with the charging pile for charging, the control module controls to switch to the charging pile discharging working mode. When no electric vehicle is connected for charging, the control module controls to automatically switch to the charging pile energy storage working mode.

The present disclosure provides an electric-quantity-based path planning method for the electric vehicle compatible with the energy storage charging pile. In this embodiment, the electric vehicle is an electric car, and the method includes the following steps.

1) All the charging piles in the whole network are connected with the dispatching system platform through a wireless communication network or a wired communication network, respectively, and the state information of this pile is submitted to the dispatching system platform, including: the position of this charging pile, the type of this pile, the rated electricity quantity $E_{rated}$ of the energy storage battery of this charging pile, the real-time energy storage electricity quantity of this charging pile and the real-time occupation status of this charging pile if it is an energy storage charging pile. Before an electric vehicle user departs, the user is connected to the dispatching system platform through a wireless communication network or a wired communication network, and puts forward an electric quantity application reservation from the departure place O to the destination D. The electric quantity application reservation includes the following information: an electric vehicle model, a departure time $t_0$, a departure place O, a destination D, an initial remaining electric quantity $bat\_cap_{str}$ of the power battery at the departure time of the electric vehicle, and an rated electric quantity $bat\_cap_i$ of the power battery of the electric vehicle i.

2) The dispatching system platform finds a shortest path $l_z$ from a departure place O to a destination D on an existing map such as GIS, where z=1.

3) The dispatching system platform judging whether the reserved allocated electric quantity at each reserved charging pile meets an endurance requirement of the electric vehicle for driving from the departure place O to the destination D when the electric vehicle selects one or more charging piles along the shortest path $l_z$ to reserve charging respectively according to the state information of the pile submitted by each charging pile and the electric quantity reservation application submitted by the electric vehicle user; if so, executing Step 4), if no, executing Step 5).

4) The dispatching system platform generates a whole-journey reservation scheme for the electric vehicle, wherein the whole-journey reservation scheme comprises assigning each reserved charging pile on the shortest path $l_z$ and the corresponding reserved allocated electric quantity for the electric vehicle, and returning information of successful reservation to the electric vehicle user to end the reservation: after the electric vehicle departs from the departure place O, the dispatching system platform guiding the electric vehicle to travel and charge according to the whole-journey reservation scheme.

5) The dispatching system platform excludes the shortest path $l_z$, where z=z+1, and then finds a new shortest path $l_z$ from the remaining paths from the departure place O to the destination D, executing the Steps 3) to 5) circularly if the new shortest path $l_z$ is found, and returning information of failed reservation to the electric vehicle user if the new shortest path $l_z$ is not found.

As a variation of Embodiment 1, Step 3), if the reserved allocated electric quantity of each reserved charging pile along the path cannot meet the endurance requirement of the electric vehicle for driving from the departure place O to the destination D, a mobile charging vehicle is sent to the path to supplement the reserved allocated electric quantity of the electric vehicle until the endurance requirement of the electric vehicle for driving from the departure place O to the destination D is met.

The method of finding the shortest path is not only to obtain the path from the electronic map, but also can be calculated by many traditional algorithms such as dijkstra algorithm. The current electronic navigation map also provides the fastest arrival path after considering the road conditions, and can also use the present disclosure to replace the shortest path for calculation.

The shortest path planned according to the method of this embodiment meets the requirements of energy consumption saving, as well as the needs of users and low-carbon society.

Embodiment 2

The charging piles of the whole road network in this embodiment are the same as those in Embodiment 1.

The present disclosure provides an electric-quantity-based path planning method for the electric vehicle compatible with the energy storage charging pile. In this embodiment, the electric vehicle is an electric car, and the method includes the following steps.

1) All the charging piles in the whole network are connected with the dispatching system platform through a wireless communication network or a wired communication network, respectively, and the electric vehicle client is connected with the dispatching system platform through a wireless communication network or a wired communication network.

All the charging piles in the road network submit the state information of this pile to the dispatching system platform, respectively, including: the position of this charging pile, the type of this pile, the rated electricity quantity $E_{rated}$ of the energy storage battery of this charging pile, the real-time occupation status of this charging pile, and the real-time energy storage electricity quantity of this charging pile if it is an energy storage charging pile. Before an electric vehicle user departs, the electric vehicle client of the electric vehicle i puts forward a reservation application to the dispatching system platform. The reservation application includes the following information: an electric vehicle user name, an electric vehicle brand, an vehicle model, a departure time $t_0$, a departure place O, a destination D, an initial remaining electric quantity $bat\_cap_{str}$ of the power battery at the departure time of the electric vehicle, and an rated electric quantity $bat\_cap_i$ of the power battery of the electric vehicle i. The dispatching system platform establishes and stores a reserved service list for each charging pile, respectively, and the field contents of the reserved service list include an electric vehicle user name, an electric vehicle brand, an vehicle model, reserved charging start time and charging pile remaining electric quantity corresponding to the time, reserved charging end time and charging pile remaining electric quantity corresponding to the time, reserved allocated electric quantity, charging duration, a type of the idle periods and corresponding allocable electricity quantity.

2) Finding the shortest path $l_z$; the dispatching system platform obtains the shortest path $l_z$ from the path set $L=\{l_1, \ldots, l_a\}$ from the departure place O to the destination D through the existing map such as GIS, where z=1, $\exists z \in [1, a]$.

3) The directed sequence matrix $(j_1, j_2, \ldots j_n)^T$ of the charging piles distributed along the path $l_z$ is obtained by the above method 1, any of $$\left(C_n^1 + C_n^2 + \ldots + C_n^{n-1} + C_n^n\right)$$

charging pile combinations that can be charged for charging by the electric vehicle i is selected. Assuming that $(j_{x1}, j_{x2}, \ldots j_{xk})^T$, the electric vehicle i is reserved for charging at each charging pile in $(j_{x1}, j_{x2}, \ldots j_{xk})^T$.

4) For the selected charging pile combination $(j_{x1}, j_{x2}) \ldots j_{xk})^T$, $(j_{x0}, j_{x1}, j_{x2}) \ldots j_{xk}, j_{xk+1})^T$ denotes the directed sequence matrix of the segmented point of the path $l_z$, where $j_{x0}$ corresponds to the departure place O, $j_{xk}+1$ corresponds to the destination D, and the rest correspond to the charging piles in $(j_{x1}, j_{x2}, \ldots j_{xk})^T$.

Assuming that the electric vehicle i arrives at each segmented point in $(j_{x0}, j_{x1}, j_{x2}, \ldots j_{xk}, j_{k+1})^T$ in sequence from the departure place O along the path $l_z$, the energy consumption of the segmented path of the electric vehicle i is estimated according to the above method 3. For each charging pile $j_w$ in $(j_{x0}, j_{x1}, j_{x2}, \ldots j_{xk}, j_{x+1})^T$ in sequence, $\forall w \in [x1, xk]$, the time $t_w$ when the electric vehicle i arrives at the charging pile $j_w$ is estimated according to the above method 6, respectively, and the remaining electric quantity $RE_i(t_w)$ at the time $t_w$ when the electric vehicle i arrives at the charging pile $j_w$ according to the above method 7, respectively; according to the above method 10, the reserved allocated electric quantity $TP_w$ of the electric vehicle i at the charging pile $j_w$, the charging duration $$T_{w,i}^{charging}$$

of the electric vehicle i at the charging pile $j_w$, the reserved charging start time $$t_{w,i}^{charging}$$

of the electric vehicle i at the charging pile $j_w$ and the corresponding remaining electric quantity $$E\left(t_{w,i}^{charging}\right)$$

of the charging pile, the reserved charging end time $$\left(t_{w,i}^{charging} + T_{w,i}^{charging}\right)$$

and the corresponding remaining electric quantity $$E\left(t_{w,i}^{charging} + T_{w,i}^{charging}\right)$$

of the charging pile are estimated, respectively.

5) In the case of each charging pile $j_w$ at the charging pile combination $(j_{x1}, j_{x2}, \ldots j_{xk})$, the energy consumption $EC_{w,w+1}$ of the electric vehicle i from the current segmented point to the next segmented point obtained in Step 4), the time $t_w$ when the electric vehicle i arrives at the charging pile $j_w$, the remaining electric power $RE_i(t_w)$ when the electric vehicle i arrives at the charging pile $j_w$, and the reserved allocated electric power $TP_w$ of the electric vehicle i at the charging pile $j_w$ all meet the following inequality set 2-1-1, the charging pile combination $(j_{x1}, j_{x2}, \ldots j_{xk})^T$, can make the shortest path $l_z$ meet the whole-journey endurance requirements of the electric vehicle i, otherwise, proceeding to Step 6).

$$\begin{cases} RE_i(t_w) + TP_w \geq EC_{w,w+1} \\ \text{bat\_cap}_{str} + \sum_{w=x1}^{xk} TP_w \geq EC_{0,n+1} \end{cases} \forall\, w \in [x1, xk] \qquad 2\text{-}1\text{-}1$$

In the inequality set 2-1-1, $\text{bat\_cap}_{str}$ is the initial remaining electric quantity of the power battery at the departure time $t_0$ of the electric vehicle i;

$$\sum_{w=x1}^{xk} TP_w$$

denotes the sum of the reserved allocated electric quantity of all the reserved charging piles of the electric vehicle i at the charging pile combination $(j_{x1}, j_{x2}, \ldots j_{xk})^T$; $EC_{0,n+1}$ denotes the estimated whole-journey energy consumption of the electric vehicle i along the shortest path $l_z$ from the departure place O to the destination D, which is accumulated after estimating the energy consumption of the segmented path of the electric vehicle i by the above method 3.

When the shortest path $l_z$ meets the whole-journey endurance requirement, a whole-journey reservation scheme is generated, and the reservation is ended. The whole-journey reservation scheme includes assigning the charging pile combination $(j_{x1}, j_{x2}, \ldots j_{xk})^T$ distributed along the shortest path $l_z$ to reserve the electric vehicle i for charging in sequence, which corresponds to the reserved allocated electric quantity $(TP_{x1}, TP_{x2}, \ldots TP_{xk})^T$, as well as the reserved charging start and end time of each reserved charging pile. The reserved service list of each charging pile $j_w$ in $(j_{x1}, j_{x2}, \ldots j_{xk})^T$ is updated according to the whole-journey reservation scheme and Step 4). After the electric vehicle starts from the departure place O, the dispatching system platform guides the electric vehicle to travel and charge according to the whole-journey reservation scheme.

6) If the charging pile combination $(j_{x1}, j_{x2}, \ldots j_{xk})^T$ cannot make the path $l_z$ meet the whole-journey endurance requirements of the electric vehicle i, the charging pile combination $(j_{x1}, j_{x2}, \ldots j_{xk})^T$ is excluded from the charging pile combination of $$\left(C_n^1 + C_n^2 + \ldots + C_n^{n-1} + C_n^n\right)$$

electric vehicles i that can be selected for charging in Step 3). If all the charging pile combination of $$\left(C_n^1 + C_n^2 + \ldots + C_n^{n-1} + C_n^n\right)$$

electric vehicles i that can be selected for charging in Step 3) have been excluded, it means that the path $l_z$ does not meet the whole-journey endurance requirements, and then proceed to Step 7). Otherwise, another combination is selected from the remaining combination after excluding the charging pile combination $(j_{x1}, j_{x2}, \ldots j_{xk})^T$ from the charging pile combination of $$\left(C_n^1 + C_n^2 + \ldots + C_n^{n-1} + C_n^n\right)$$

electric vehicles i that can be selected for charging, and proceed to Step 4) to carry out cyclic execution to Step 6).

7) The path $l_z$ is excluded from the path set $L=\{l_1, \ldots, l_a\}$ in Step 2). If the paths in the path set $L=\{l_1, \ldots, l_a\}$ have been excluded to an empty set, the customer failed reservation information is returned, and the reservation ends: if the path of the path set L has not been excluded to an empty set, then z=z+1, a new shortest path $l_z$ is found from the remaining path set L, and proceed to Step 3) to start cyclic execution to Step 6).

As another variation of this embodiment, considering the influence of practical factors such as road conditions and driving conditions of automobile users, the electric vehicle i may arrive at the reserved charging pile $j_w$ in advance or later. In order not to affect the reservation, the estimated time $t_w$ when the electric vehicle i arrives at the charging pile $j_w$ can be replaced by $t_w-\theta$ or $t_w+\theta$, where $\theta$ is a user-defined duration value. The other methods and steps remain unchanged.

As another variation of this embodiment, if N charging pile combinations among the charging pile combination of $$\left(C_n^1+C_n^2+\ldots+C_n^{n-1}+C_n^n\right)$$

electric vehicles i that can be selected for charging enables the path $l_z$ to meet the whole-journey endurance requirements of the electric vehicle i, the combination with the least reserved charging times, that is, the least reserved charging piles, is selected to generate the whole-journey reservation scheme. The other methods and steps remain unchanged.

As another variation of this embodiment, considering the driver's driving fatigue, charging on the way is a rest stop point, and the charging pile can be selected by dividing the rest stop point into several time points equally. The combination containing the charging piles that must reserve for charging is selected from $$\left(C_n^1+C_n^2+\ldots+C_n^{n-1}+C_n^n\right)$$

combinations in Step (3) as an alternative. The other methods and steps remain unchanged.

As another variation of this embodiment, considering that logistics electric vehicles have a designated operating point, the designated operating point has a charging pile, which is used as the charging pile that must reserve for charging, of the logistics electric vehicles. In Step (2), only the path containing the charging pile that must reserve for charging can be selected. The combination containing the charging piles that must reserve for charging can only be selected from $$\left(C_n^1+C_n^2+\ldots+C_n^{n-1}+C_n^n\right)$$

combinations in Step (3) as an alternative. The other methods and steps remain unchanged.

As another variation of this embodiment, every time a $\Delta t$ time passes, the dispatching system platform re-announces the idle period type and the corresponding allocable electricity quantity of each energy storage charging pile $j_w$ in the charging pile combination $(j_{x1}, j_{x2}, \ldots j_{xk})^T$ according to the method 9, and updates the reserved service list of each energy storage charging pile $j_w$; re-estimates the reserved allocated electricity quantity $TP_w$ of each energy storage charging pile $j_w$ according to the method 10, and re-estimates the time $t_w$ when the electric vehicle i arrives at the charging pile $j_w$ according to the method 6, and then starts cyclic execution from Step 4) to Step 6) to re-plan the electric-quantity-based path of the electric vehicle.

As another variation of this embodiment, if it is a charging station with multiple charging piles, it is only necessary to set the distance between the charging piles in the charging station as a minimum value, for example, 1 meter, which also applies to the method of Embodiment 2 to plan the charging path, so that the electric vehicle i can reserve different charging piles in one charging station for charging.

In the prior art, the connection structure between some direct current charging piles and power supply is as follows. The alternating current generated by wind generators is converted into direct current and flows into a common direct current bus after rectification, and the direct current generated by photovoltaic power generation flows into the common direct current bus through a transformer, or the mains supply is converted into direct current and flows into the common direct current bus after rectification. The direct current generated by the energy storage batteries of the charging piles flows into the common direct current bus through a transformer. The common direct current bus is connected with an electric vehicle. When the energy storage battery of the charging pile is insufficient, photovoltaic power generation, wind power generation or mains supply can charge the energy storage battery and the electric vehicle at the same time. $\Delta t$ this time, the electric vehicle is slowly charged, which is equivalent to directly supplying the charging pile to the power grid. When the energy storage battery of the charging pile is sufficient, the electric vehicle is charged by the energy storage battery of the charging pile. $\Delta t$ this time, the electric vehicle is fast charged, which is equivalent to the energy storage charging pile. The method of this embodiment is also applicable.

Embodiment 3

The charging piles of the whole road network in this embodiment are the same as those in Embodiment 1.

The present disclosure provides an electric-quantity-based path planning method for the electric vehicle compatible with the energy storage charging pile. In this embodiment, the electric vehicle is an electric car, and the method for adjusting the preceding vehicle also includes the following steps.

1. Assuming that before the reservation of the electric vehicle i, the existing preceding vehicles reserve charging paths according to the method of Embodiment 2, respectively, and generate their own whole-journey reservation schemes, respectively. The preceding vehicle in this embodiment indicates that: at least one charging pile with which the electric vehicle i is reserved to charge is referred to as the common pile, including the vehicle that has been reserved but has not yet departed when the electric vehicle i is expected to arrive at the common pile: further including the vehicle that has departed after the reservation, but has not yet traveled to the common pile when the electric vehicle i is expected to arrive at the common pile.
2. The electric vehicle i is reserved according to the method in Embodiment 2, starting from Step 1) in Embodiment 2. In Step 2), the shortest path $l_z$ in the path set $L=\{l_1, \ldots, l_a\}$ from the departure place O to the destination D is selected. When it is concluded in Step 6) that the shortest path $l_z$ does not meet the whole-journey endurance requirements, the preceding vehicle is adjusted according to Step 3 below.
3. According to Step 3) of Embodiment 2, any of $$\left(C_n^1+C_n^2+\ldots+C_n^{n-1}+C_n^n\right)$$

charging pile combinations that can be selected for charging by the electric vehicle i in the shortest path $l_z$ is selected to reserve for charging. Assuming that for $(j_{x1}, j_{x2}, \ldots j_{xk})^T$, when electric vehicle i reserves electric quantity at the charging pile $j_w$ but cannot meet Equation 2-1-1 in Step 5), that is, electric vehicle i reserves electric quantity at the charging pile $j_w$ but cannot drive to the next segmented point $j_{w+1}$, both $j_w$ and $j_{w+1}$ are the segmented points in $(j_{x0}, j_{x1}, j_{x2}, \ldots j_{xk}, j_{x+1})^T$. The whole-journey reservation scheme of the preceding vehicle is adjusted, which can be a whole-journey reservation scheme for adjusting the preceding vehicle for any of the common piles or multiple common piles. The adjustment methods include but are not limited to the methods.

Adjustment method 1): the reserved allocated electric quantity of the preceding vehicle at one or more common piles is cancelled, and the cancelled reserved allocated electric quantity is re-incorporated into the remaining electric quantity of their corresponding charging piles. Thereafter, according to the methods in Steps 3) to 6) of Embodiment 2, it is judged whether the shortest path $l_z$ of the electric vehicle i and the path of the original whole-journey reservation scheme of the preceding vehicle meet the whole-journey endurance requirements of the electric vehicle i and the preceding vehicle, respectively, wherein if so, the dispatching system platform generates a whole-journey reservation scheme for the electric vehicle i, and generates a new whole-journey reservation scheme for the preceding vehicle, and the adjustment is successful; if the path does not meet the endurance requirement of the electric vehicle i and the preceding vehicle, it is impossible to adjust the preceding vehicle and restore the original whole-journey reservation scheme of the preceding vehicle.

Adjustment method 2): the reserved allocated electric quantity of the preceding vehicle at one or more common piles is reduced. The sum of the reserved allocated electric quantity reduced by the preceding vehicle is greater than or equal to the electric quantity $\Delta TP^i$ that the electric vehicle i is expected to lack when driving to the next segmented point $j_{w+1}$ after reserving electric quantity at the charging pile $j_w$, and $\Delta TP^i$ is estimated according to the following Equation 3-1-1:

$$\Delta TP^i = EC_{w,w+1} - RE_i(t_w) - TP_w \qquad 3\text{-}1\text{-}1$$

where; $EC_{w,w+1}$ denotes the energy consumption of the electric vehicle i from the current charging pile $j_w$ to the next charging pile, $t_w$ is the estimated time when electric vehicle i arrives at the charging pile $j_w$, $RE_i(t_w)$ is the estimated remaining electric quantity of the electric vehicle i at the time $t_w$ when the electric vehicle arrives at the charging pile $j_w$, and $TP_w$ is the reserved allocated electric quantity of the electric vehicle i at the charging pile $j_w$.

The reserved allocated electric quantity reduced at each common pile is re-incorporated into the remaining electric quantity of their corresponding charging piles. Thereafter, according to the methods in Steps 3) to 6) of Embodiment 2, it is judged whether the shortest path $l_z$ of the electric vehicle i and the path of the original whole-journey reservation scheme of the preceding vehicle meet the whole-journey endurance requirements of the electric vehicle i and the preceding vehicle, respectively, wherein if so, the dispatching system platform generates a whole-journey reservation scheme for the electric vehicle i, and generates a new whole-journey reservation scheme for the preceding vehicle, and the adjustment is successful; if the path does not meet the endurance requirement of the electric vehicle i and the preceding vehicle, it is impossible to adjust the preceding vehicle and restore the original whole-journey reservation scheme of the preceding vehicle.

Charging scheduling is performed on the vehicle through the dispatching system platform. The original disorderly reservation specified by a user based on the pile position is upgraded to the unified planning and allocation by the scheduling platform based on the energy demand of the users in the whole network and the charging pile resources, and the users are subjected to mandatory scheduling, thus maximizing the resource utilization and meeting the driving needs of more vehicles.

Embodiment 4

The charging piles of the whole road network in this embodiment are the same as those in Embodiment 1.

The present disclosure provides an electric-quantity-based path planning method for the electric vehicle compatible with the energy storage charging pile. In this embodiment, the electric vehicle is an electric car, and the correcting method also includes the following steps.

The electric vehicle generates the whole-journey reservation scheme according to the electric-quantity-based path planning method for the electric vehicle compatible with the energy storage charging pile in Embodiment 2 or 3.

Because the whole-journey reservation scheme of the electric vehicles is to reserve in advance, in order to prevent the great changes of the actual vehicle parameters or charging pile parameters at the time of departure or after departure and during reservation from affecting the smooth travel and charging of the electric vehicles according to the whole-journey reservation scheme, the following correction methods are used to correct the whole-journey reservation scheme of the electric vehicles, respectively.

Correction method 1; if the parameters determined before the electric vehicle departs, including departure time, on-board mass $m_{negative}$ and the initial remaining electric quantity of the power battery of the electric vehicle, are different from the information submitted when applying for reservation, the determined parameters are resubmitted to the dispatching system platform, and the dispatching system platform uses the electric-quantity-based path planning method of Embodiment 2 or Embodiment 3 to regenerate the whole-journey reservation scheme according to the determined parameters. When the electric vehicle departs from the departure place O, the dispatching system platform guides the electric vehicle to travel and charge according to the new whole-journey reservation scheme. If the electric-quantity-based path planning method in Embodiment 2 or Embodiment 3 cannot generate a new whole-journey reservation scheme, the reservation fails.

Correction method 2; after the electric vehicle departs and travels for a period of time or distance, the electric vehicle calculates the average driving speed, average energy consumption and vehicle load according to the actual driving parameters including the change of the remaining electric quantity of the power battery of the electric vehicle and the mileage, and submits them to the dispatching system platform again. The dispatching system platform uses the electric-quantity-based path planning method of Embodiment 2 or Embodiment 3 to regenerate the whole-journey reservation scheme to guide the electric vehicle to travel and charge according to the actual parameters. The actual parameters can be obtained through the self-detection of the electric vehicle and reported to the dispatching system platform through the wireless network, the driver's telephone or the vehicle terminal voice, or reported to the dispatching system platform after being estimated by the driver according to the experience value.

Correction method 3; whenever the dispatching system platform generates a whole-journey reservation scheme for an electric vehicle, or after the electric vehicle is charged according to the whole-journey reservation scheme, the dispatching system platform updates the service list content of the corresponding reserved charging pile.

Correction method 4; it is known that the whole-journey reservation scheme of the electric vehicles includes the estimated time $t_w$ arriving at the charging pile $j_w$, the estimated reserved allocated electric quantity $TP_w$ of the electric vehicle at the charging pile $j_w$, the charging duration $$T_{w,i}^{charing}$$

of the electric vehicles at the charging pile $j_w$, the reserved charging start time $$t_{w,i}^{charing}$$

and the remaining electric quantity $$E\left(t_{w,i}^{charging}\right)$$

corresponding to the charging pile, the reserved charging end time $$\left(t_{w,i}^{charging} + T_{w,i}^{charging}\right)$$

and the remaining electric quantity $$E\left(t_{w,i}^{charging} + T_{w,i}^{charging}\right)$$

corresponding to the charging pile.

After the electric vehicle is on the road, during the travel, the map software on the vehicle provides the current position $P_a$, the current time $t_a$, the distance $D_{aw}$ from the nearest reserved charging pile $j_w$, and the driving time $t_{aw}$ from $P_a$ to $j_w$ in real time.

If $|(t_a+t_{aw})-t_w|>\theta$ occurs in the timing judgment of the electric vehicle, where $\theta$ is a user-defined duration value, the electric vehicle user applies to the dispatching system platform to modify the reservation at the charging pile $j_w$, and the dispatching system platform inquires about the reserved service list of the charging pile $j_w$. If the idle period≥the charging duration $$T_{w,i}^{charing}$$

occurs after the time $(t_a+t_{aw})$, and the allocable electric quantity corresponding to the idle period≥the reserved allocated electric quantity $TP_w$, the idle period is allocated to the electric vehicle. The estimated time to arrive at the charging pile $j_w$ and the reserved charging start time are modified as both $(t_a+t_{aw})$. The reserved charging duration and the reserved allocated electric quantity at the charging pile $j_w$ are unchanged, so that the whole-journey reservation scheme of the electric vehicle is updated. Δt the same time, the original reservation of the electric vehicle at the charging pile $j_w$ is cancelled, and then the reserved service list of the charging pile $j_w$ is updated.

If the idle period≥the charging duration $$T_{w,i}^{charing}$$

does not occur after the time $(t_a+t_{aw})$, and the allocable electric quantity corresponding to the idle period≥the reserved allocated electric quantity $TP_w$, the dispatching system platform informs the user that the reservation at the charging pile $j_w$ cannot be modified, and the electric vehicle should apply to the dispatching system platform for re-planning a new electric-quantity-based path according to the electric-quantity-based path planning method for the electric vehicle compatible with the energy storage charging pile in Embodiment 2 or 3.

Embodiment 5

An electric quantity reserving method of an energy storage charging pile includes the following steps.

(1) an energy storage charging pile establishes and stores a reserved service list of the pile, and the field contents of the reserved service list include an electric vehicle user name, an electric vehicle brand, an vehicle model, reserved charging start time and charging pile remaining electric quantity corresponding to the time, reserved charging end time and charging pile remaining electric quantity corresponding to the time, reserved allocated electric quantity, charging duration, a type of the idle periods and corresponding allocable electricity quantity.

(2) the energy storage charging pile announces the type of each idle period of the pile and the corresponding allocable electric quantity according to the method 9 without affecting the period when the preceding vehicle has reserved for charging and the reserved allocable electric quantity.

(3) a vehicle-mounted terminal of the electric vehicle is connected with the energy storage charging pile through a wireless network, the type of the idle period and the corresponding allocable electric quantity announced in Step (2) are obtained, and an electric vehicle user selects a suitable idle period as required to reserve for charging the energy storage charging pile through the vehicle-mounted terminal of the electric vehicle.

(4) after the electric vehicle is reserved, the energy storage charging pile updates the reserved service list of the pile according to the reserved result of Step (3).

As another variation of this embodiment, this energy storage charging pile is connected to the dispatching system platform through wireless or wired connection without affecting the reserved service list of this pile, and participates in the overall management of the dispatching system platform according to the electric-quantity-based path planning method of Embodiment 2, 3 or 4, just like other energy storage charging piles in the whole network. On the other hand, the energy storage charging piles in the whole network in Embodiment 2, 3 or 4 can provide electric quantity reservation for the electric vehicle according to the electric quantity reserving method of the energy storage charging pile in Embodiment 5 without affecting their respective reserved service lists.

Through this method, based on the electricity storage prediction of the energy storage charging pile, the multi-user charging behavior of the energy storage charging pile and the discharging behavior of the energy storage charging pile are unified in the time dimension, and the multi-user reservation of the energy storage charging pile is realized.

The method in Embodiments 1 to 5 of the present disclosure is not only suitable for an electric vehicle, but also suitable for an unmanned aerial vehicle or unmanned ships. Reservation and electric-quantity-based path planning are made after considering modification of the airworthiness area and meteorological conditions.

What is claimed is:

1. An electric-quantity-based path planning method for an electric vehicle compatible with an energy storage charging pile, wherein a power supply source of the energy storage charging pile is complementary energy storage for generating electricity from new energy or purchasing electricity from a power grid, comprising:

1) submitting state information via charging piles in a network to a dispatching system platform;
2) an electric vehicle user applying to the dispatching system platform for an electric quantity application reservation from a departure place (O) to a destination (D) through a network connection before departure, wherein the electric quantity application reservation comprises an electric vehicle model, a vehicle load quality, a departure time, departure place (O), the destination (D) and a remaining electric quantity of a power battery of the electric vehicle user at the departure time;
3) finding a shortest path ($l_z$) from a departure place (O) to a destination (D) on an existing map, where z=1 in the dispatching system platform;
4) reserving the allocated electric quantity at each charging pile;
5) selecting one or more charging piles along the shortest path ($l_z$) according to the state information of the charging pile submitted by each charging pile and the electric quantity reservation application submitted by the electric vehicle user;
6) determining whether the reserved allocated electric quantity at one or more selected charging by a dispatching system platform meets an endurance requirement of the electric vehicle for driving from the departure place (O) to the destination (D) and if not, skipping steps 7-8;
7) generating a whole-journey reservation scheme for the electric vehicle in the dispatching system platform by assigning each reserved charging pile on the shortest path ($l_z$) and the corresponding reserved allocated electric quantity for the electric vehicle, and returning information of successful reservation to the electric vehicle user to end the reservation;
8) guiding the electric vehicle to travel and charge according to the whole-journey reservation scheme in the dispatching system platform after the electric vehicle departs from the departure place (O);
9) excluding the shortest path ($l_z$), where z=z+1, and then finding a new shortest path ($l_z$) from the departure place (O) to the destination (D) in the dispatching system platform;
10) executing Steps 6-9 if the new shortest path ($l_z$) is found, and returning information of failed reservation to the electric vehicle user if the new shortest path ($l_z$) is not found.

2. The electric-quantity-based path planning method for an electric vehicle compatible with an energy storage charging pile according to claim 1, wherein selecting one or more charging piles along the shortest path ($l_z$) in Step 5 comprises assuming that there are n charging piles distributed along the shortest path ($l_z$), there are $$\left(C_n^1 + C_n^2 + \ldots + C_n^{n-1} + C_n^n\right)$$

charging pile combinations selected for charging by the electric vehicle, and any charging pile combination is selected or the charging pile combination with the least number of the charging piles is reserved for charging.

3. The electric-quantity-based path planning method for an electric vehicle compatible with an energy storage charging pile according to claim 1, wherein determining whether the reserved allocated electric quantity at selected charging pile(s) by a dispatching system platform meets an endurance requirement of Step 6 comprises:

assuming that the selected charging pile(s) are $(j_{x1}, \mathbf{1}_{x2}, \ldots j_{xk})^T$; and judging in sequence whether the reserved allocated electric quantity corresponding to each of the charging piles ($j_w$) meets an inequality set 2-1-1, wherein if so, the shortest path ($l_z$) meets the endurance requirement of the electric vehicle for driving from the departure place (O) to the destination (D); otherwise, the shortest path ($l_z$) does not meet the endurance requirement of the electric vehicle for driving from the departure place (O) to the destination (D);

$$\begin{cases} RE_i(t_w) + TP_w \geq EC_{w,w+1} \\ \text{bat\_cap}_{str} + \sum_{w=x1}^{xk} TP_w \geq EC_{0,n+1} \end{cases} \forall\, w \in [x1, xk] \qquad 2\text{-}1\text{-}1$$

wherein in the inequality set 2-1-1, $RE_i(t_w)$ is an estimated remaining electric quantity of the electric vehicle at the time ($t_w$) when the electric vehicle arrives at the charging pile ($j_w$), $TP_w$ denotes the reserved allocated electric quantity of the electric vehicle at the charging pile ($j_w$), when the charging pile ($j_w$) is not the last charging pile on the shortest path ($l_z$), $EC_{w,w+1}$ denotes the estimated energy consumption of the electric vehicle from the current charging pile ($j_w$) to the next charging pile ($j_{w+1}$), if the charging pile ($j_w$) is the last charging pile in the shortest path ($l_z$), when the charging pile ($j_w$) is the last charging pile on the shortest path ($l_z$), $EC_{w,w+1}$ denotes the estimated energy consumption of the electric vehicle from the current charging pile ($j_w$) to the destination (D); $\text{bat\_cap}_{str}$ is the initial remaining electric quantity of the power battery at the departure time ($t_0$) of the electric vehicle;

$$\sum_{w=x1}^{xk} TP_w$$

denotes the sum of the reserved allocated electric quantity of all the reserved charging piles of the electric vehicle at the charging pile combination $(j_{x1}, j_{x2}, \ldots j_{xk})^T$; and $EC_{0,n+1}$ denotes the estimated whole-journey energy consumption of the electric vehicle along the shortest path ($l_z$) from the departure place (O) the destination (D).

4. The electric-quantity-based path planning method for an electric vehicle compatible with an energy storage charging pile according to claim 3, wherein the time ($t_w$) when the electric vehicle arrives at the charging pile ($j_w$) is estimated according to the following Equation 6-1:

$$t_w = t_0 + \text{the sum of the pre-reserved charging duration} + \text{the sum of the pre-queuing charging duration} + t_{0,w} \quad (6\text{-}1)$$

in Equation 6-1, $t_0$ denotes the departure time of the electric vehicle; $t_{0,w}$ denotes the estimated driving duration of the electric vehicle along the shortest path ($l_z$) from the departure place (O) to the charging pile ($j_w$); the sum of the pre-reserved charging duration refers to the cumulative value of the estimated reserved charging duration that has reserved for charging at other charging piles along the path when the electric vehicle arrives at the charging pile ($j_w$) along the shortest path ($l_z$) from the departure place (O); the sum of the pre-queuing charging duration refers to the cumulative value of the estimated queuing charging duration that has reserved for charging at other charging piles along the path when the electric vehicle arrives at the charging pile ($j_w$) along the shortest path ($l_z$) from the departure place (O).

5. The electric-quantity-based path planning method for an electric vehicle compatible with an energy storage charging pile according to claim 3, wherein the remaining electric quantity ($RE_i(t_w)$) of the electric vehicle at the time ($t_w$) when the electric vehicle arrives at the charging pile ($j_w$) is estimated according to the following Equation 7-1:

$$RE_i(t_w) = \text{bat\_cap}_{str} + \text{the sum of the pre-reserved allocated electric quantity} - EC_{0,w} \quad (7\text{-}1)$$

in Equation 7-1, $\text{bat\_cap}_{str}$ is an initial remaining electric quantity when the electric vehicle departs; the sum of the pre-reserved allocated electric quantity refers to the cumulative value of the reserved allocated electric quantity at other charging piles along the path up to the time ($t_w$) when the electric vehicle arrives at the charging pile ($j_w$) from the departure place (O) along the shortest path ($l_z$); $EC_{0,w}$ indicates the estimated energy consumption of the electric vehicle driving along the shortest path ($l_z$) from the departure place (O) to the charging pile ($j_w$).

6. The electric-quantity-based path planning method for an electric vehicle compatible with an energy storage charging pile according to claim 3, wherein the reserved allocated electric quantity of the electric vehicle at the charging pile ($j_w$) is $TP_w$, and when the charging pile ($j_w$) is an energy storage charging pile, the specific step of the method for estimating the reserved allocated electric quantity ($TP_w$) is as follows:

(10-1-1), assuming that the electric vehicle is an electric vehicle (i), presetting a queuing time limit (σ) after the time ($t_w$) when the electric vehicle (i) arrives at the charging pile ($j_w$) first, wherein σ is a user-defined time value;

(10-1-2), according to a reserved service list of the charging pile ($j_w$), searching types of the idle period of the charging pile ($j_w$) between $t_w$ and $t_w+\sigma$, wherein if all the found types of the idle period are energy storage periods, the charging pile ($j_w$) is incapable of reserving for charging the electric vehicle (i), that is, the reserved allocated electricity quantity $TP_w=0$; if the found idle period type is an allocable electricity quantity idle period, proceeding to Step (10-1-3);

(10-1-3), searching the reserved service list of the charging pile ($j_w$), if the idle period of the charging pile ($j_w$) between $t_w$ and $t_w+\sigma$ is $$[t_1^\circ, \infty),$$

$$[t_1^\circ, \infty)$$

indicates that there is no vehicle reserving for charging after $$t_1^\circ,$$

that is, $$[t_1^\circ, \infty)$$

is the allocable electricity quantity idle period and is infinite; if the idle period of the charging pile ($j_w$) is not infinite between $t_w$ and $t_w+\sigma$, proceeding to Step (10-1-4); assuming that the preceding vehicle ($i_1$) has reserved for charging in a period $$[t_1, t_1^\circ],$$

where $t_1$ and $$t_1^\circ$$

correspond to the reserved charging start time and the reserved charging end time of the preceding vehicle ($i_1$) respectively, $E(t_1)$ and $$E(t_1^\circ)$$

correspond to the estimated remaining electric quantity of the charging pile ($j_w$) at the time $t_1$ and $$t_1^\circ,$$

and the reserved allocated electric quantity of the preceding vehicle ($i_1$) is $$TP_1 = E(t_1^\circ) - E(t_1);$$

the reserved charging start time $$\left(t_{w,i}^{charging}\right)$$

of the electric vehicle (i) at the charging pile ($j_w$) is estimated according to the following Equation 10-1:

$$t_{w,i}^{charging} = \max(t_1^\circ, t_w) \quad \text{10-1}$$

the allocable electricity quantity $$Q_w\left(t_{w,i}^{charing}\right)$$

of the charging pile ($j_w$) in $$[t_1^\circ, \infty)$$

is estimated according to the following equation set 10-2:

$$\begin{cases} Q_w\left(t_{w,i}^{charging}\right) = E(t_1^\circ) + \int_{t_1^\circ}^{t_{w,i}^{charging}} p_{stroage}(t) \times d(t), \\ \quad \text{when } t_1^\circ \le t_{w,i}^{charging} \le t^{rated} \\ Q_w\left(t_{w,i}^{charging}\right) = E_{rated} \text{ when } t_{w,i}^{charging} > t^{rated} \end{cases} \quad \text{10-2}$$

the constraint condition of the equation set 10-2 is as follows:

$$0 \le E(t_1^\circ) + \int_{t_1^\circ}^{t_{w,i}^{charging}} p_{stroage}(t) \times d(t) \le E_{rated};$$

the reserved allocable electricity quantity ($TP_w$) of the charging pile ($j_w$) in $$[t_1^\circ, \infty)$$

is estimated according to the following equation set 10-3:

$$TP_w = \min\left(Q_w\left(t_{w,i}^{charging}\right), (\text{bat\_cap}_i - RE_i(t_w))\right); \quad \text{10-3}$$

the reserved charging duration $$\left(T_{w,i}^{charging}\right)$$

of the electric vehicle (i) at the charging pile ($j_w$) is estimated according to the following Equation 10-4:

$$T_{w,i}^{charging} = TP_w \div P_w^{out}; \quad \text{10-4}$$

the remaining electric quantity of the reserved charging start time $$\left(t_{w,i}^{charging}\right)$$

corresponding to the charging pile ($j_w$) is $$E\left(t_{w,i}^{charging}\right) = Q_w\left(t_{w,i}^{charging}\right),$$

the remaining electric quantity of the reserved charging end time $$\left(t_{w,i}^{charging} + T_{w,i}^{charging}\right)$$

corresponding to the charging pile ($j_w$) is $$E\left(t_{w,i}^{charging} + T_{w,i}^{charging}\right) = E\left(t_{w,i}^{charging}\right) - TP_w;$$

the above variables in the equations in Step (10-1-3) are defined as follows:

$$t_{w,i}^{charging}$$

is the reserved charging start time of the electric vehicle (i) at the charging pile ($j_w$); $t_w$ is the estimated time when the electric vehicle (i) arrives at the charging pile ($j_w$);

$$Q_w\left(t_{w,i}^{charging}\right)$$

is the allocable electricity quantity of the charging pile ($j_w$) in $$[t_1^\circ, \infty);$$

$$E(t_1^\circ)$$

is the remaining electric quantity of the charging pile ($j_w$) at the reserved charging end time $$(t_1^\circ)$$

corresponding to the preceding vehicle ($i_1$); $p_{storage}(t)$ is the predicted energy storage power of the charging pile ($j_w$) at the corresponding time (t), which is predicted by the prior art method;

$$P_w^{out}$$

is a constant output power of the charging pile ($j_w$); $E_{rated}$ is the rated electricity quantity of the energy storage battery of the charging pile ($j_w$); $t^{rated}$ is the time when the energy storage of the charging pile ($j_w$) reaches the rated electricity quantity $E_{rated}$ in $$[\overset{\circ}{t}_1, \infty);$$

$bat\_cap_i$ is the rated electricity quantity of the power battery of the electric vehicle (i), $RE_i(t_w)$ is the estimated remaining electric quantity of the electric vehicle (i) at the time ($t_w$) when the electric vehicle arrives at the charging pile ($j_w$); $TP_w$ is the reserved allocated electricity quantity of the electric vehicle (i) in $$[\overset{\circ}{t}_1, \infty)$$

of the charging pile ($j_w$);

$$T_{w,i}^{charging}$$

is the reserved charging duration of the electric vehicle (i) at the charging pile ($j_w$);

(10-1-4), if the idle period of the charging pile ($j_w$) between $t_w$ and $t_w+\sigma$ is an allocable idle period and is finite, assuming that the preceding vehicle ((1) has reserved for charging at the charging pile ($j_w$) in the period $$[t_1, \overset{\circ}{t}_1],$$

the reserved allocated electric quantity is $$TP_1 = E(\overset{\circ}{t}_1) - E(t_1);$$

assuming that the preceding vehicle ($i_2$) has reserved for charging at the charging pile ($j_w$) in the period $$[t_2, \overset{\circ}{t}_2],$$

the reserved allocated electric quantity is $$TP_2 = E(\overset{\circ}{t}_2) - E(t_2);$$

where $t_1$ and $$\overset{\circ}{t}_1$$

correspond to the reserved charging start time and the reserved charging end time of the preceding vehicle ($i_1$), respectively, $t_2$ and $$\overset{\circ}{t}_2$$

correspond to the reserved charging start time and the reserved charging end time of the preceding vehicle ($i_2$), respectively;

$$t_1 < \overset{\circ}{t}_1 < t_2 < \overset{\circ}{t}_2;$$

$E(t_1)$, $$E(\overset{\circ}{t}_1),$$

$E(t_2)$ and $$E(\overset{\circ}{t}_2)$$

correspond to the estimated remaining electric quantity of the charging pile ($j_w$) at the time $t_1$, $$\overset{\circ}{t}_1,$$

$t_2$ and $$\overset{\circ}{t}_2;$$

$$[\overset{\circ}{t}_1, t_2]$$

is the allocable electricity quantity idle period, the precondition for the charging pile ($j_w$) to allow the electric vehicle (i) to jump a queue to reserve for charging in the allocable electricity quantity idle period $$[\overset{\circ}{t}_1, t_2]$$

is to not affect the reserved allocated electricity quantity and the reserved charging start and end time of other preceding vehicles that have already reserved for charging after this period $$[\overset{\circ}{t}_1, t_2],$$

that is, ensuring that the reserved allocated electricity quantity $TP_2$ of the preceding vehicle ($i_2$) in the reserved charging period $$[t_2, t_2^{\circ}]$$

remains unchanged first, that is, meeting the following Equation 10-5:

$$TP_2 \le E(t_1^{\circ}) + \int_{t_1^{\circ}}^{t_{w,i}^{charging}} p_{storage}(t) \times d(t) - P_w^{out} \times \left(t_3^{\circ} - t_{w,i}^{charging}\right) + \int_{t_3^{\circ}}^{t_2} p_{storage}(t) \times d(t) \qquad \text{10-5}$$

the constraint condition of Equation 10-5 is:

$$\begin{cases} E(t_1^{\circ}) + \int_{t_1^{\circ}}^{t_{w,i}^{charging}} p_{storage}(t) \times d(t) - P_w^{out} \times \left(t_3^{\circ} - t_{w,i}^{charging}\right) + \int_{t_3^{\circ}}^{t_2} p_{storage}(t) \times d(t) \le E_{rated} \\ 0 \le E(t_1^{\circ}) + \int_{t_1^{\circ}}^{t_{w,i}^{charging}} p_{storage}(t) \times d(t) \le E_{rated} \\ P_w^{out} \times \left(t_3^{\circ} - t_{w,i}^{charging}\right) \le E(t_1^{\circ}) + \int_{t_1^{\circ}}^{t_{w,i}^{charging}} p_{storage}(t) \times d(t) \\ t_1 < t_1^{\circ} \le t_{w,i}^{charging} < t_3^{\circ} < t_2 < t_2^{\circ} \end{cases}$$

according to Equation 10-5 and its constraint condition, calculating the latest charging end time $$(t_3^{\circ})$$

of the electric vehicle (i) when the charging pile ($j_w$) allows the electric vehicle (i) to jump a queue for charging, and estimating the allocable electric quantity $$Q_w\left(t_{w,i}^{charging}\right)$$

of the charging pile ($j_w$) in the allocable electric quantity idle period $$[t_1^{\circ}, t_2]$$

according to the following equation set 10-6:

$$\begin{cases} Q_w\left(t_{w,i}^{charging}\right) = E(t_1^{\circ}) + \int_{t_1^{\circ}}^{t_{w,i}^{charging}} p_{storage}(t) \times d(t), \\ \quad \text{when } t_{w,i}^{charging} < t^{rated} \\ Q_w\left(t_{w,i}^{charging}\right) = E_{rated}, \text{ when } t^{rated} \le t_{w,i}^{charging} < t_3^{\circ} \text{ and} \\ \quad \left(t_3^{\circ} - t_{w,i}^{charging}\right) > \left(\frac{E_{rated}}{P_w^{out}}\right) \\ Q_w\left(t_{w,i}^{charging}\right) = P_w^{out} \times \left(t_3^{\circ} - t_{w,i}^{charging}\right), \\ \text{when } t^{rated} \le t_{w,i}^{charging} < t_3^{\circ} \text{ and } \left(t_3^{\circ} - t_{w,i}^{charging}\right) \le \left(\frac{E_{rated}}{P_w^{out}}\right) \end{cases} \qquad \text{10-6}$$

in the Equation 10-5 and Equation 10-6, estimating the reserved charging start time $$\left(t_{w,i}^{charging}\right)$$

of the electric vehicle (i) at the charging pile ($j_w$) according to the following Equation 10-7:

$$t_{w,i}^{charging} = \max(t_1^{\circ}, t_w) \qquad \text{10-7}$$

obtaining $$Q_w\left(t_{w,i}^{charging}\right)$$

according to Equation 10-6, and estimating the reserved allocated electric quantity $TP_w$ of the electric vehicle (i) at the charging pile ($j_w$) according to the following Equation 10-8:

$$TP_w = \min\left(Q_w\left(t_{w,i}^{charging}\right), (\text{bat\_cap}_i - RE_i(t_w))\right) \qquad \text{10-8}$$

obtaining $TP_w$ according to Equation 10-8, and estimating the reserved allocated charging duration $$T_{w,i}^{charging}$$

of the electric vehicle (i) at the charging pile ($j_w$) according to the following Equation 10-8:

$$T_{w,i}^{charging} = TP_w \div P_w^{out} \qquad \text{10-9}$$

if there are other preceding vehicles that reserve for charging at the charging pile ($j_w$) before the electric vehicle (i), but the time for reserving for charging is after the period $$[t_2, t_2^{\circ}]$$

of the preceding vehicle ($i_2$) reserved for charging, the precondition for the charging pile ($j_w$) to allow the electric vehicle (i) to jump a queue to reserve for charging in the allocable electricity quantity idle period $$[t_1^\circ, t_2]$$

is that in addition to ensuring that the reserved allocated electricity quantity $TP_2$ of the preceding vehicle (2) in the reserved charging period $$[t_2, t_2^\circ]$$

remains unchanged, it is also necessary to ensure that the reserved start and end time and the reserved allocated electricity quantity of all other preceding vehicles remain unchanged, and the specific methods are as follows:

assuming that there are other preceding vehicles ($i_4$) that reserve for charging in the period $$[t_4, t_4^\circ]$$

before the electric vehicle (i), the reserved allocated electric quantity is $TP_4$, in which $$t_2 < t_2^\circ < t_4 < t_4^\circ,$$

$TP_w$ also meets the following Equation 10-10:

$$TP_4 \le E(t_1^\circ) + \int_{t_1^\circ}^{t_{w,i}^{charging}} p_{storage}(t) \times d(t) - TP_w + \int_{t_{w,i}^{charging}+T_{w,i}^{charging}}^{t_2} p_{storage}(t) \times d(t) - TP_2 + \int_{t_2^\circ}^{t_4} p_{storage}(t) \times d(t); \quad 10\text{-}10$$

if $TP_w$ does not meet Equation 10-10, $TP_w$ is reduced, and the corresponding $$T_{w,i}^{charging}$$

is also reduced according to Equation 10-9 until Equation 10-10 is met;

if after the reserved charging period $$[t_4, t_4^\circ]$$

of the preceding vehicle ($i_4$), there are other preceding vehicles $i_5$, $i_6$ . . . reserving for charging at the charging pile ($j_w$) before the electric vehicle (i), the preceding vehicles are processed according to the method of the preceding vehicle ($i_4$) respectively until $TP_w$ can ensure that the reserved start and end time and reserved allocated electric quantity of all other preceding vehicles remain unchanged; if $TP_w$ is reduced to the preset threshold value, but it is not ensured that the reserved start and end time and the reserved allocated electric quantity of all other preceding vehicles remain unchanged, and the charging pile ($j_w$) does not allow the electric vehicle (i) to jump a queue for reserved charging in the idle period $$[t_1^\circ, t_2],$$

that is, assuming that the reserved allocated electric quantity is $TP_w=0$;

if the final $TP_w \neq 0$, the remaining electric quantity of the charging pile ($j_w$) corresponding to the reserved charging start time $$t_{w,i}^{charging} \text{ is } E(t_{w,i}^{charging}) = E(t_1^\circ) + \int_{t_1^\circ}^{t_{w,i}^{charging}} p_{storage}(t) \times d(t),$$

and the remaining electric quantity of the charging pile ($j_w$) corresponding to the reserved charging end time $$(t_{w,i}^{charging} + T_{w,i}^{charging}) \text{ is } E(t_{w,i}^{charging} + T_{w,i}^{charging}) = E(t_{w,i}^{charging}) - TP_w;$$

the above variables in the equations in Step (10-1-4) are defined as follows: $TP_2$ is the reserved allocated electricity quantity of the preceding vehicle ($i_2$) in the reserved charging period $$[t_2, t_2^\circ];$$

$$E(t_1^\circ)$$

is the remaining electric quantity of the charging pile ($j_w$) at the reserved charging end time $$t_1^\circ$$

corresponding to the preceding vehicle ($i_1$); $p_{storage}(t)$ is the predicted energy storage power of the charging pile ($j_w$) at the corresponding time (t), which is predicted by the prior art method;

$$P_w^{out}$$

is a constant output power of the charging pile $$(j_w);\ t_{w,i}^{charging}$$

is the reserved charging start time of the electric vehicle (i) at the charging pile ($j_w$); $t_w$ is the estimated time when the electric vehicle (i) arrives at the charging pile ($j_w$); $E_{rated}$ is the rated electricity quantity of the energy storage battery of the charging pile ($j_w$);

$$t_3^\circ$$

is the latest charging end time of the electric vehicle (i) when the charging pile ($j_w$) allows the electric vehicle (i) to jump a queue for charging, and $$Q_w\left(t_{w,i}^{charging}\right)$$

is the estimated allocable electric quantity of the charging pile ($j_w$) in $$\left[\mathring{t}_1, t_2\right];$$

$t^{rated}$ is the time when the energy storage of the charging pile ($j_w$) reaches the rated electricity quantity $E_{rated}$ in $$\left[\mathring{t}_1, \infty\right);$$

$bat\_cap_i$ is the rated electricity quantity of the power battery of the electric vehicle (i), $RE_i(t_w)$ is the estimated remaining electric quantity of the electric vehicle (i) at the time ($t_w$) when the electric vehicle arrives at the charging pile ($j_w$); $TP_w$ is the reserved allocated electricity quantity of the electric vehicle (i) in $$\left[\mathring{t}_1, \infty\right)$$

of the charging pile $$(j_w);\ T_{w,i}^{charging}$$

is the reserved charging duration of the electric vehicle (i) at the charging pile ($j_w$); $TP_4$ is the reserved allocated electric quantity of the preceding vehicle ($i_4$) in the period $$\left[t_4, \mathring{t}_4\right].$$

7. The electric-quantity-based path planning method for an electric vehicle compatible with an energy storage charging pile according to claim 6, further comprising Step (10-1-5), wherein every time a ($\Delta$t) time passes, the dispatching system platform executes from Step (10-1-2) to Step (10-1-4) according to the reserved service list of the charging pile ($j_w$), and re-estimates the reserved allocated electric quantity $TP_w$.

8. The electric-quantity-based path planning method for an electric vehicle compatible with an energy storage charging pile according to claim 3, wherein the reserved allocated electric quantity of the electric vehicle at the charging pile ($j_w$) is $TP_w$, and when the charging pile ($j_w$) is a power-grid direct-supply charging pile for estimating the reserved allocated electric quantity ($TP_w$) comprises:

(10-2-1) assuming that the electric vehicle is an electric vehicle (i), setting a queuing time limit ($\sigma$) after the time ($t_w$) when the electric vehicle (i) arrives at the charging pile ($j_w$) first, where ($\sigma$) is a user-defined time value;

(10-2-2) according to a reserved service list of the charging pile ($j_w$), finding whether there is an idle period between the time ($t_w$) and the time $t_w+\sigma$ when the electric vehicle (i) arrives at the charging pile ($j_w$); wherein if there is no idle period, estimating the allocable electric quantity $Q_w(i)=0$ that the charging pile ($j_w$) is capable of supplying to the electric vehicle (i); that is, the reserved allocated electricity quantity $TP_w=0$ of the electric vehicle (i) at the charging pile ($j_w$); if there is an idle period, proceeding to Step (10-2-3);

(10-2-3) if the idle period is infinite, the idle period is denoted as $$\left[\mathring{t}_1, \infty\right),$$

where $$\mathring{t}_1$$

corresponds to the reserved charging end time of the preceding vehicle ($i_1$) and there is no other preceding vehicle reserved for charging after $$\mathring{t}_1;$$

the reserved allocated electric quantity $TP_w$ of the electric vehicle (i) at the charging pile ($j_w$) is estimated according to Equation 10-11:

$$TP_w = \text{bat\_cap}_i - RE_i(t_w) \qquad 10\text{-}11$$

in Equation 10-11, $bat\_cap_i$ is the rated electricity quantity of the power battery of the electric vehicle (i), $RE_i(t_w)$ is the estimated remaining electric quantity of the electric vehicle (i) at the time ($t_w$) when the electric vehicle arrives at the charging pile ($j_w$);

the reserved charging start time_of the electric vehicle (i) at the charging pile ($j_w$) is $$t_{w,i}^{charging} = \max(\mathring{t}_1, t_w);$$

where $t_w$ is the estimated time when the electric vehicle (i) arrives at the charging pile ($j_w$);

obtaining $TP_w$ according to Equation 10-11, and the reserved charging duration is $$T_{w,i}^{charging} = TP_w \div P_w^{out};\ \text{where } P_w^{out}$$

is a constant output power of the charging pile ($j_w$);

(10-2-4), if the idle period is finite, assuming that the preceding vehicle ($i_1$) has reserved for charging at the charging pile ($j_w$) in the period $$[t_1, \overset{\circ}{t_1}];$$

there is a preceding vehicle ($i_2$) that has reserved for charging at the charging pile ($j_w$) in the period $$[t_2, \overset{\circ}{t_2}];$$

where $t_1$ and $$\overset{\circ}{t_1}$$

correspond to the reserved charging start time and the reserved charging end time of the preceding vehicle ($i_1$), respectively, $t_2$ and $$\overset{\circ}{t_2}$$

correspond to the reserved charging start time and the reserved charging end time of the preceding vehicle ($i_2$), respectively;

$$t_1 < \overset{\circ}{t_1} < t_2 < \overset{\circ}{t_2};$$

and the reserved allocated electric quantity ($TP_w$) of the electric vehicle (i) at the charging pile ($j_w$) is estimated according to the following Equation 10-12:

$$TP_w = \min\{(\text{bat\_cap}_i - RE_i(t_w)), P_w^{out} \times (t_2 - t_{w,i}^{charging})\} \quad 10\text{-}12$$

in Equation 10-12, $\text{bat\_cap}_i$ is the rated electricity quantity of the power battery of the electric vehicle (i), $RE_i(t_w)$ is the estimated remaining electric quantity of the electric vehicle (i) at the time ($t_w$) when the electric vehicle arrives at the charging pile $$(j_w);\ P_w^{out}$$

is a constant output power of the charging pile $$(j_w);\ t_{w,i}^{charging}$$

is the reserved charging start time of the electric vehicle (i) at the charging pile $$(j_w),\ t_{w,i}^{charging} = \max(\overset{\circ}{t_1}, t_w);$$

the reserved charging duration of the electric vehicle (i) at the charging pile $$(j_w)\ is\ T_{w,i}^{charging} = TP_w \div P_w^{out}.$$

9. The electric-quantity-based path planning method for an electric vehicle compatible with an energy storage charging pile according to claim 6, wherein the time ($t_w$) when the electric vehicle arrives at the charging pile ($j_w$) is replaced with $t_w-\theta$ or $t_w+\theta$, where $\theta$ is a user-defined duration value.

10. The electric-quantity-based path planning method for an electric vehicle compatible with an energy storage charging pile according to claim 1, further comprising a method for adjusting a preceding vehicle comprising:

canceling or reducing the reserved allocated electric quantity of preceding vehicles at one or more common piles, judging whether the shortest path ($l_z$) of the electric vehicle (i) and the path of the original whole-journey reservation scheme of the preceding vehicle meet the whole-journey endurance requirements of the electric vehicle (i) and the preceding vehicle, respectively, wherein if so, the dispatching system platform generates a whole-journey reservation scheme for the electric vehicle (i), and generates a new whole-journey reservation scheme for the preceding vehicle; if any of the preceding vehicles does not meet the whole-journey endurance requirement, it is impossible to adjust the preceding vehicle and restore the original whole-journey reservation scheme of the preceding vehicle.

* * * * *